US011338197B2

(12) United States Patent
Pelissier et al.

(10) Patent No.: US 11,338,197 B2
(45) Date of Patent: *May 24, 2022

(54) INFORMATION HANDLING SYSTEM CONTROLLER DISTRIBUTABLE HARDWARE AND LOGIC MANAGEMENT

(71) Applicant: Dell Products L.P., Round Rock, TX (US)

(72) Inventors: Gerald R. Pelissier, Mendham, NJ (US); Yagiz C. Yildiz, Austin, TX (US); Kevin M. Turchin, Cedar Park, TX (US); Huan Hsun Cheng, Taipei (TW); Chia Han Li, Taipei (TW)

(73) Assignee: Dell Products L.P., Round Rock, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/731,423

(22) Filed: Dec. 31, 2019

(65) Prior Publication Data

US 2021/0197076 A1 Jul. 1, 2021

(51) Int. Cl.
*A63F 13/23* (2014.01)
*A63F 13/24* (2014.01)
*G06F 13/42* (2006.01)

(52) U.S. Cl.
CPC .......... *A63F 13/24* (2014.09); *G06F 13/4291* (2013.01); *A63F 2300/1031* (2013.01); *A63F 2300/1043* (2013.01)

(58) Field of Classification Search
CPC .. A63F 13/24; A63F 13/06; A63F 2300/1043; A63F 13/98; A63F 13/23;
(Continued)

(56) References Cited

U.S. PATENT DOCUMENTS 6,811,491 B1 11/2004 Levenberg et al.
7,281,338 B2 10/2007 Ziegmann et al.
(Continued)

FOREIGN PATENT DOCUMENTS

| CN | 108079576 A | 5/2018 |
|---|---|---|
| JP | 2017220185 A | 12/2017 |
| KR | 20150056066 A | 5/2015 |

OTHER PUBLICATIONS

"I2C", Sep. 7, 2018, Wikipedia, <https://en.wikipedia.org/w/index.php?title=I%C2%B2C&oldid=858512621>(Year: 2018).*

*Primary Examiner* — Justin L Myhr
(74) *Attorney, Agent, or Firm* — Zagorin Cave LLP; Robert W. Holland

(57) ABSTRACT

A portable information handling system interacts with a game controller through either a direct connection at a wired interface at the sides of opposing controller housings and the information handling system housing or through a bridge having a bridge housing that directly couples to the controller housing as a bridge to the information handling system, such as with a wireless interface. Embedded code executing on a controller processor in the controller housing supports a controller state machine that interacts directly with the information handling system or with a bridge state machine executing as embedded code on a bridge processor. Updates to the embedded code may be communicated both to and from the controller through the information handling system or the bridge.

17 Claims, 32 Drawing Sheets

(58) Field of Classification Search
CPC .............. A63F 2300/1006; A63F 13/92; A63F 2300/204; A63F 2300/1025; A63F 13/08; A63F 13/42; A63F 13/20; A63F 13/02
See application file for complete search history.

(56) References Cited

U.S. PATENT DOCUMENTS

| | | | |
|---|---|---|---|
| 7,833,097 | B1 | 11/2010 | Maddox et al. |
| 8,249,452 | B2 | 8/2012 | Biegert et al. |
| 8,419,541 | B2 | 4/2013 | Mao |
| 8,934,226 | B2 | 1/2015 | Smith |
| 9,539,507 | B2 | 1/2017 | Schoenith et al. |
| 10,335,676 | B2 | 7/2019 | Gohara |
| 10,610,776 | B2 | 4/2020 | Iwao |
| 10,898,812 | B2 | 1/2021 | Zimring et al. |
| 11,013,987 | B1 | 5/2021 | Pelissier et al. |
| 11,013,991 | B1 | 5/2021 | Seibert et al. |
| 2004/0235566 | A1 | 11/2004 | Hussaini et al. |
| 2009/0298590 | A1* | 12/2009 | Marks ..................... A63F 13/23 463/37 |
| 2010/0267454 | A1* | 10/2010 | Navid ..................... A63F 13/23 463/37 |
| 2010/0282932 | A1 | 11/2010 | Ong et al. |
| 2011/0190058 | A1 | 8/2011 | Houston |
| 2011/0205161 | A1 | 8/2011 | Myers et al. |
| 2012/0077586 | A1 | 3/2012 | Pishevar |
| 2012/0088582 | A1 | 4/2012 | Wu et al. |
| 2012/0091313 | A1 | 4/2012 | Cohn |
| 2012/0295704 | A1 | 11/2012 | Reiche et al. |
| 2012/0302347 | A1 | 11/2012 | Nicholson |
| 2013/0063342 | A1* | 3/2013 | Chen ..................... G06F 3/0383 345/156 |
| 2014/0085829 | A1 | 3/2014 | Yamashita |
| 2014/0106875 | A1 | 4/2014 | Nguyen et al. |
| 2014/0221087 | A1 | 8/2014 | Huang et al. |
| 2015/0018101 | A1 | 1/2015 | Schoenith et al. |
| 2015/0073340 | A1 | 3/2015 | Pacheco et al. |
| 2015/0254924 | A1 | 9/2015 | Pececnik |
| 2015/0323996 | A1 | 11/2015 | Obana |
| 2015/0363994 | A1 | 12/2015 | Nguyen et al. |
| 2016/0166927 | A1 | 6/2016 | Leyland et al. |
| 2016/0166933 | A1 | 6/2016 | Leyland et al. |
| 2016/0361633 | A1* | 12/2016 | Fujita ..................... A63F 13/213 |
| 2016/0361639 | A1* | 12/2016 | Schmitz ................ A63F 13/218 |
| 2017/0056762 | A1 | 3/2017 | Gafni |
| 2017/0124370 | A1 | 5/2017 | He et al. |
| 2017/0228960 | A1 | 8/2017 | Nguyen et al. |
| 2017/0356740 | A1 | 12/2017 | Ansari et al. |
| 2017/0361223 | A1 | 12/2017 | Gohara |
| 2018/0133602 | A1 | 5/2018 | Miwa et al. |
| 2018/0178118 | A1 | 6/2018 | Kyuma |
| 2018/0178121 | A1* | 6/2018 | Yamashita .............. A63F 13/92 |
| 2018/0185749 | A1 | 7/2018 | Kidakarn |
| 2018/0214771 | A1* | 8/2018 | Tran ....................... A63F 13/92 |
| 2018/0365001 | A1* | 12/2018 | Shimohata ................ G06F 8/65 |
| 2019/0015744 | A1 | 1/2019 | Ueda |
| 2019/0118082 | A1 | 4/2019 | Townley et al. |
| 2019/0192962 | A1 | 6/2019 | Kasuno et al. |
| 2019/0228609 | A1 | 7/2019 | Nguyen et al. |
| 2020/0001176 | A1 | 1/2020 | Barney et al. |
| 2020/0376376 | A1 | 12/2020 | Demers |
| 2020/0398155 | A1 | 12/2020 | Niwa |
| 2021/0016160 | A1 | 1/2021 | Kitahara et al. |
| 2021/0027574 | A1 | 1/2021 | Rodriguez et al. |

\* cited by examiner

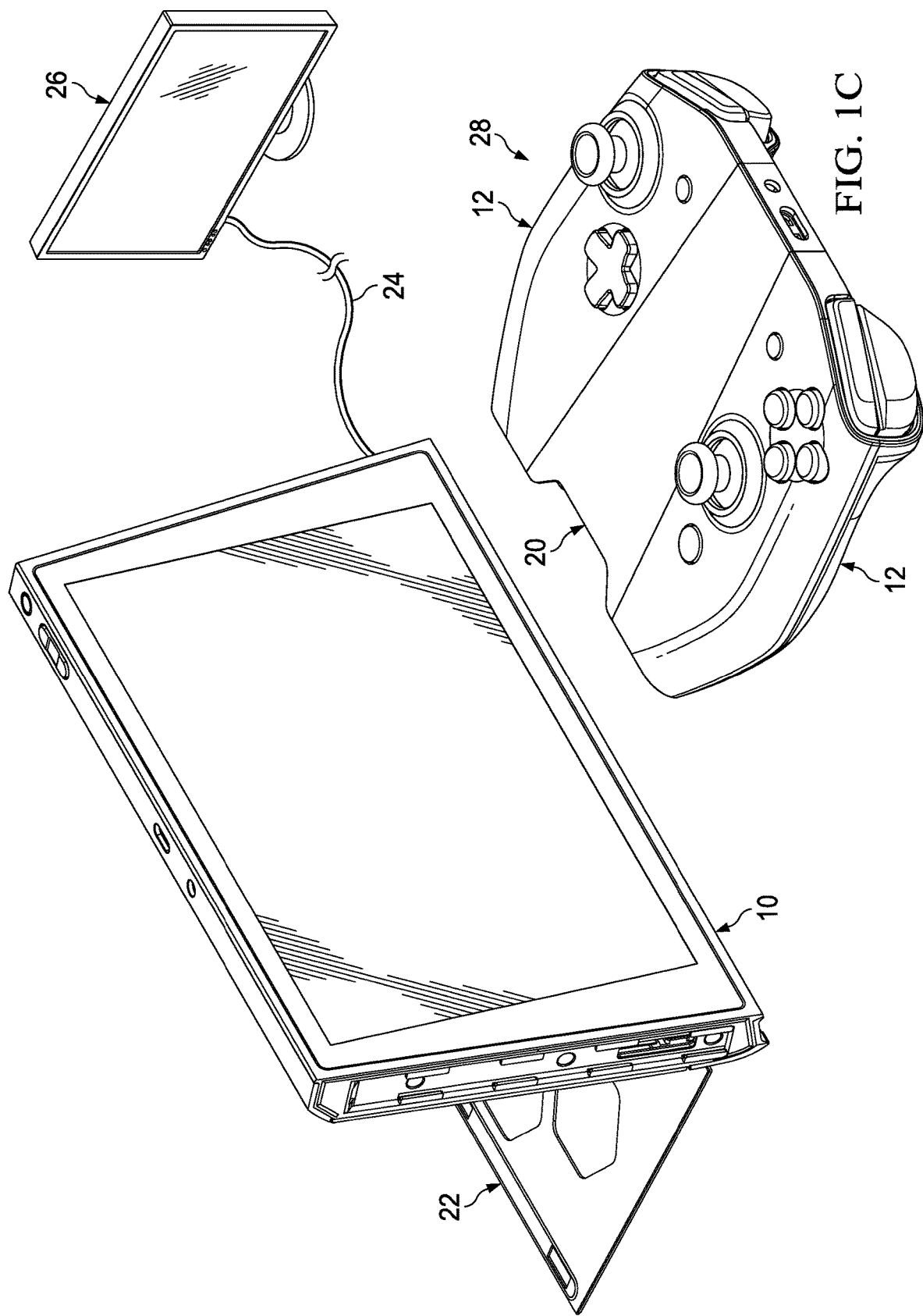

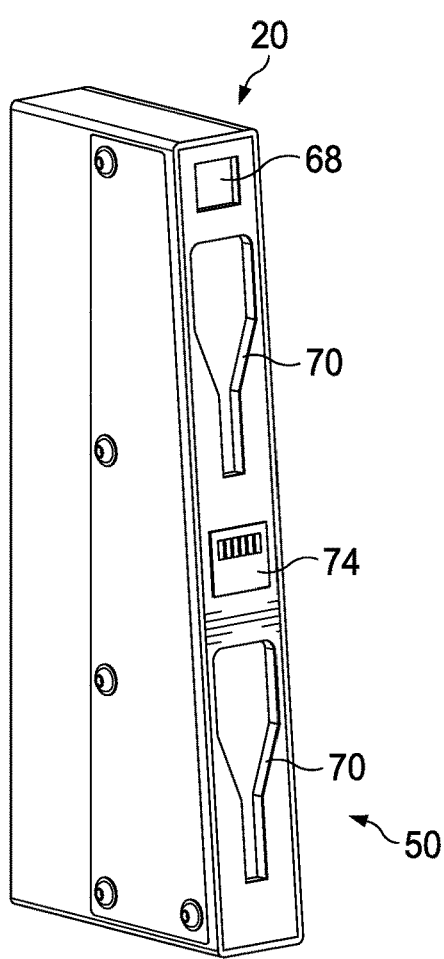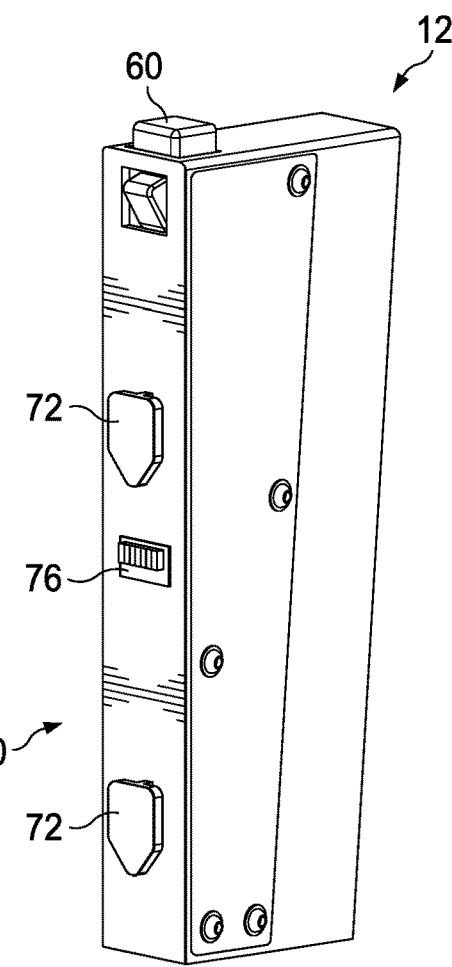
FIG. 3A  FIG. 3B
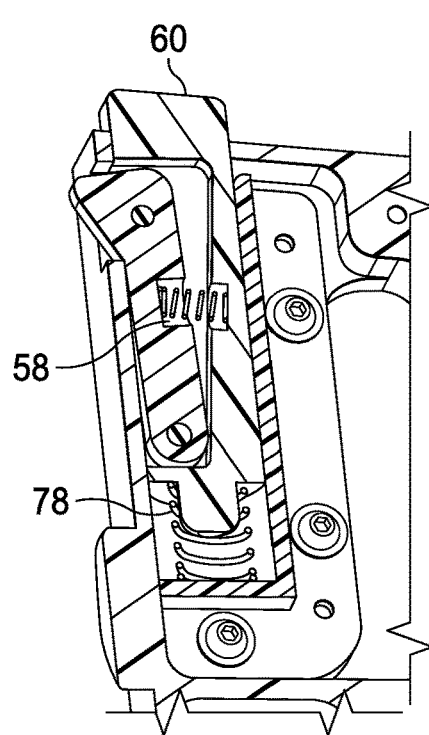
FIG. 3C

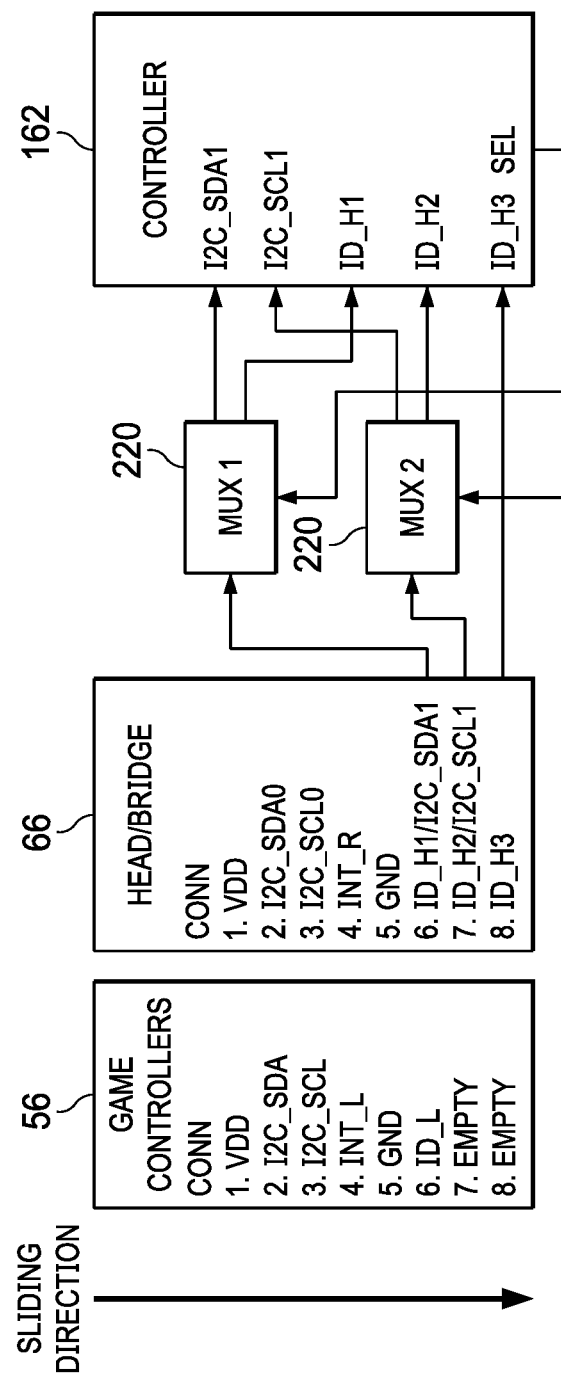

| L GAME CONTROLLER | | | POGO INTERFACE | HEAD (TABLET) | | | | POGO INTERFACE | R GAME CONTROLLER | | |
|---|---|---|---|---|---|---|---|---|---|---|---|
| DEFINITION | PIN | | | PIN | REMARK | | | | PIN | DEFINITION | |
| VDD | 1 | | | 1 | POWER OF L/R GAME CONTROLLER, 5V | | | | 1 | VDD | |
| INT_L | 2 | | | 2 | OUTPUT, DATA INTERRUPT | | | | 2 | INT_R | |
| I2C_SCL | 3 | | | 3 | I2C | | | | 3 | I2C_SCL | |
| I2C_SCK | 4 | | | 4 | I2C | | | | 4 | I2C_SCK | |
| GND | 5 | | | 5 | GROUND OF L/R GAME CONTROLLER | | | | 5 | GND | |
| ID_L | 6 | | | 6 | INPUT FOR GAME CONTROLLER ATTACHED INDICATION | | | | 6 | ID_R | |
| RESERVED | 7 | | | 7 | GUIDE AND POWER BUTTON | | | | 7 | GUIDE | |

FIG. 14B

| L GAME CONTROLLER | | | HEAD (TABLET) | | | | | R GAME CONTROLLER | |
|---|---|---|---|---|---|---|---|---|---|
| DEFINITION | PIN | POGO INTERFACE | PIN | REMARK | PIN | POGO INTERFACE | PIN | DEFINITION |
| VDD | 1 | ↕ | 1 | POWER OF L/R GAME CONTROLLER, 3.3V | 1 | ↕ | 1 | VDD |
| I2C_SDA | 2 | | 2 | I2C | 2 | | 2 | I2C_SDA |
| I2C_SCK | 3 | | 3 | I2C | 3 | | 3 | I2C_SCK |
| INT_L | 4 | | 4 | OUTPUT, DATA INTERRUPT | 4 | | 4 | INT_R |
| GND | 5 | | 5 | GROUND | 5 | | 5 | GND |
| ID_L | 6 | | 6 | INPUT FOR GAME CONTROLLER ATTACHED INDICATION | 6 | | 6 | ID_R |

FIG. 15B

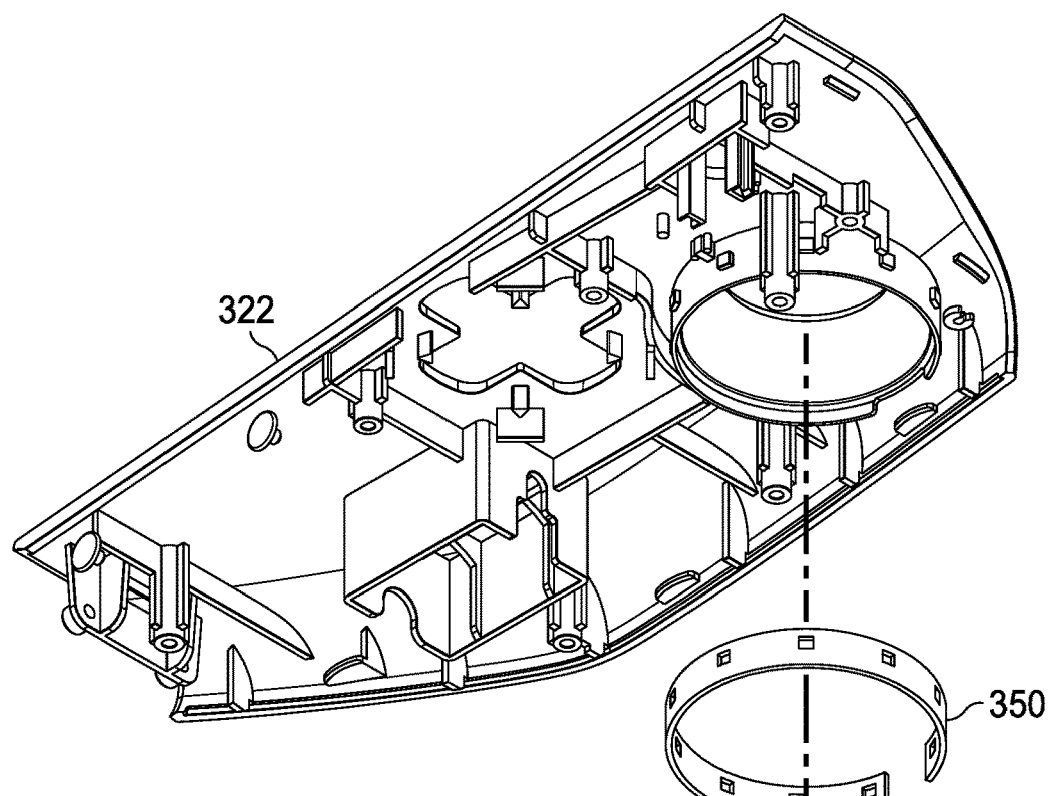
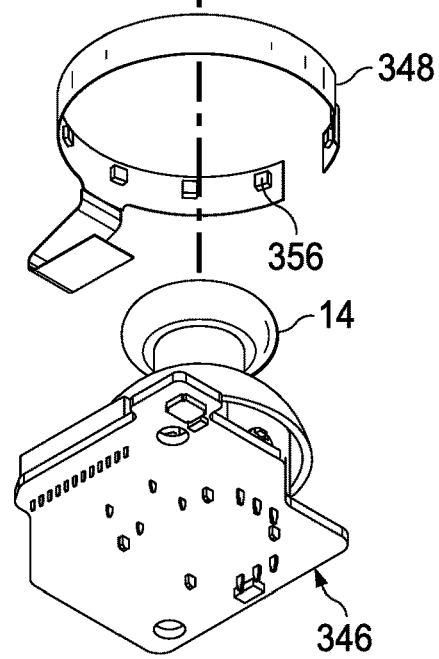
FIG. 27A
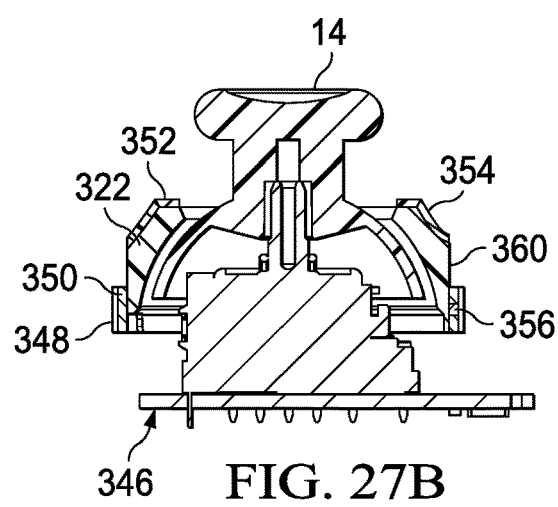
FIG. 27B

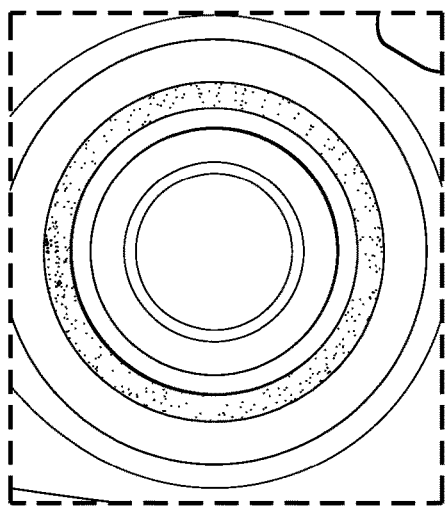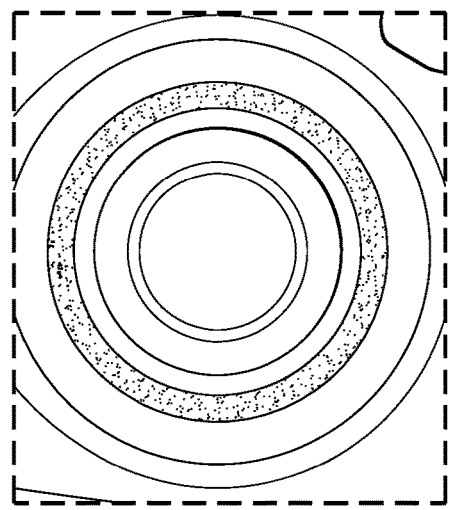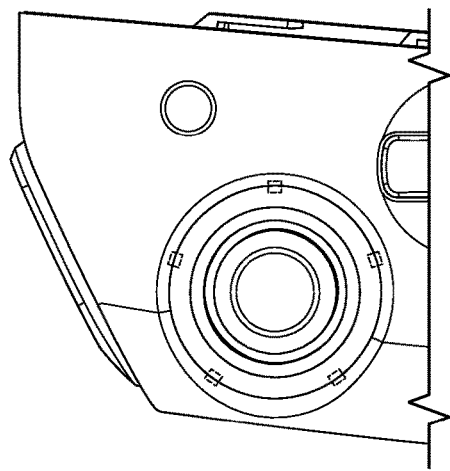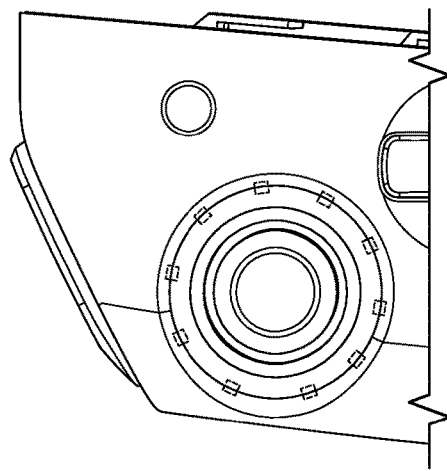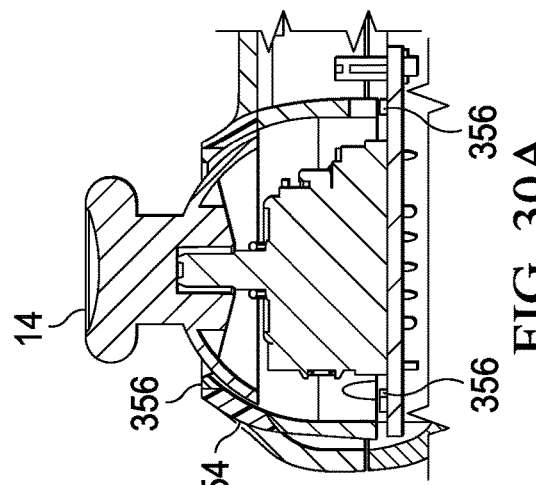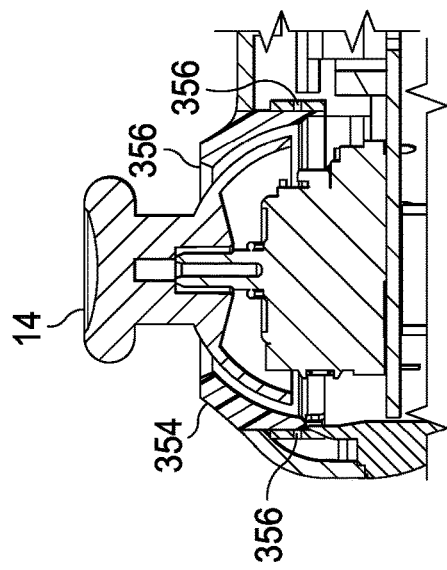

INFORMATION HANDLING SYSTEM CONTROLLER DISTRIBUTABLE HARDWARE AND LOGIC MANAGEMENT

BACKGROUND OF THE INVENTION

Field of the Invention

The present invention relates in general to the field of information handling system communication interfaces, and more particularly to an information handling system controller scalable interface.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are commonly used as gaming platforms that run gaming applications. Typical gaming applications rely upon the availability of substantial processing capability to provide an end user with an acceptable gaming experience. Heavy processing tasks include not just interacting with the end user through one or more input devices, but interacting with multiple external players through network communications. In addition, gaming applications typically lean heavily on graphics processing capabilities to quickly and accurately present a game user interface with high resolution. Intense information and graphics processing tends to have a heavy power draw and to create high levels of thermal energy dissipated by the central processing unit and graphics processing unit. Often gamers purchase high end desktop systems with premium processing, graphics and thermal capabilities. Generally, non-portable desktop systems offer the best form factor for including the capabilities that gamers seek.

Some gamers who travel will also use portable information handling systems to play gaming applications. Portable information handling systems designed to support gaming applications tend to have larger and heavier housings that will support greater processing, graphics and thermal demands. A typical portable information handling system designed to meet gaming demands will include a 17 inch flat panel display in a clamshell housing and a graphics processing unit that will support high resolution images at peripheral display. Smaller housing sizes will support gaming applications but tend to lose processing and thermal capabilities as housing size shrinks. Generally, end users of portable information handling systems will have a cradle or docking station at home that leverages the processing capabilities of the system with external peripheral devices, such as a keyboard, mouse, and game controller with a joystick, trigger and other button input devices.

One difficulty with using a portable information handling system to play games in a mobile situation is that the input devices integrated in a portable information handling system tend to have limited capabilities for gaming applications. An end user may use an integrated keyboard and mousepad to perform inputs, however, these input devices are tied to the display by the clamshell housing so that consuming visual images is more difficult. An alternative is to carry separate peripheral input devices to use while playing games, such as a wireless or USB game controller. Often, these additional devices are inconvenient to carry and to track while mobile. An end user tends to spend a good deal of time setting up his system to play so that a quick access while between flights is too time constrained.

Some gamers use mobile systems dedicated to gaming for mobile play, such as the NINTENDO SWITCH. These specialized mobile systems integrate gaming controllers in the same housing as a display so the end user holds the housing with the display in a viewing position while making inputs at a joystick, trigger and buttons integrated in the housing. Such specialized systems tend to have limited capabilities and lock the user into integrated inputs devices. The display tends to have limited resolution and the system does not typically support other information handling system tasks like word processing, email and web browsing. Thus, the end user generally has to take the specialized gaming system in addition to an information handling system for regular processing tasks. Further, specialized gaming systems with integrated input devices tend to take a good deal of damage during normal use as end users tend to get excited while playing games. These normal gaming input forces can destroy input devices in short order if the specialized gaming system does not have a robust design. Further, where end users tend to engage in extended gaming sessions, these smaller specialized systems can become uncomfortable over time.

SUMMARY OF THE INVENTION

Therefore, a need has arisen for a system and method which provides an information handling system with a detachable game controller.

In accordance with the present invention, a system and method are provided which substantially reduce the disadvantages and problems associated with previous methods and systems for performing inputs at an information handling system. An information handling system having a tablet form factor in a planar housing executes a gaming application to present a gaming user interface at an integrated display. First and second game controllers to accept inputs to the gaming application selectively attach and detach at opposing sides of the information handling system. When attached to the information handling system, the game controllers communicate inputs through a wired interface directly to the information handling system, such as joystick, button and trigger inputs. When detached from the information handling system, the game controllers attach to opposing sides of a bridge to communicate indirectly with the information handling system intermediated by the bridge, such as through wireless or cabled interface between the bridge and information handling system.

More specifically, a portable information handling system processes information with a central processing unit (CPU) and memory disposed in a planar housing and presents the information as visual images at an integrated display through a graphics processing unit (GPU). An attachment structure at each of opposing sides of the planar housing detachably engages with first and second game controllers that include input devices to accept inputs from an end user, such as a joystick, input buttons and a trigger. A wired interface disposed in the attachment structure, such as pogo pins aligned with contact pads, directly communicate inputs at the input devices to the information handling system, such as for inputs to a gaming application. In this handheld configuration, an end user grasps the game controllers at opposing sides of the planar tablet to perform inputs at the input devices while viewing the display. The handheld configuration couples the game controllers in the plane of the planar housing to provide a comfortable gaming position and ready mobility. The game controllers detach from the planar housing so that the information handling system converts to a tablet configuration and, with a stand integrated in the rear side, rests on a support surface to operate in a standalone configuration. The game controllers attach to a bridge structure having the attachment structure to define a wired interface between the bridge and a game controller on each of opposing sides of the bridge. Inputs at the game controller are communicated to the bridge through the wired interface, such as through an I2C interface, and then from the bridge to the information handling system through a wireless, USB and/or IP interface. In the standalone configuration, the game controllers in cooperation with the bridge provide a peripheral game controller for inputs to the information handling system.

The present invention provides a number of important technical advantages. One example of an important technical advantage is that an end user is provided with increased flexibility for interacting with an information handling system. An end user can input to an information handling system in a handheld mode of operation by attaching game controllers directly to the information handling system housing or in a standalone mode by attaching the game controllers to a separate bridge. Each of the game controllers, bridge and information handling system include a processor, such as microcontroller unit (MCU) that coordinates communication, detects inputs and applies haptic and illumination feedback. These processor interactions provide additional flexibility for different game controllers to adapt optional features, such as speakers or extra battery storage. The game controllers include robust input devices, such as a trigger that rotates about an axis normal to the plane of the housing to withstand high end user forces. By including a powerful graphics processor unit in the information handling system, such as the INTEL Ice Lake and Tiger Lake system on chips with integrated graphics processing, the standalone mode supports excellent graphics presentation at both the integrated display and a peripheral display. Portability for go-anywhere gaming is balanced with comfort and performance to support extended gaming sessions with high performance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 1A, 1B, 1C and 1D depict a portable information handling system configured with detachable game controllers in handheld and peripheral configurations;

FIGS. 3A, 3B and 3C depict a side perspective view of an alternative embodiment of an attachment structure that couples a game controller 12 to a bridge or information handling system;

FIG. 13 depicts an alternative embodiment of game controller pin arrangements having an identifier pin used as an indication of the number of used and empty wired interface pins;

FIGS. 14A and 14B depict a circuit block diagram of a seven pin count wired interface between an information handling system 10 and first and second game controllers 12 coupled at opposing sides;

FIGS. 15A and 15B depict a circuit block diagram of a six pin count wired interface between an information handling system and first and second game controllers having an identification pin repurposed to control power;

FIGS. 27A and 27B depict a lower perspective exploded view of an illumination assembly that provides illumination at a joystick extending from an upper surface of a game controller;

FIGS. 30A, 30B and 30C depict a joystick illuminated by five LEDs mounted at a bottom location; and FIGS. 31A, 31B and 31C depict a joystick illuminated by ten LEDs mounted at a side location.

DETAILED DESCRIPTION

A portable information handling system adapts to handheld and stationary gaming input interactions with detachable gaming controllers that selectively couple to opposing sides of the portable information handling system housing or to a bridge that provides communication as a peripheral input device. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1A:
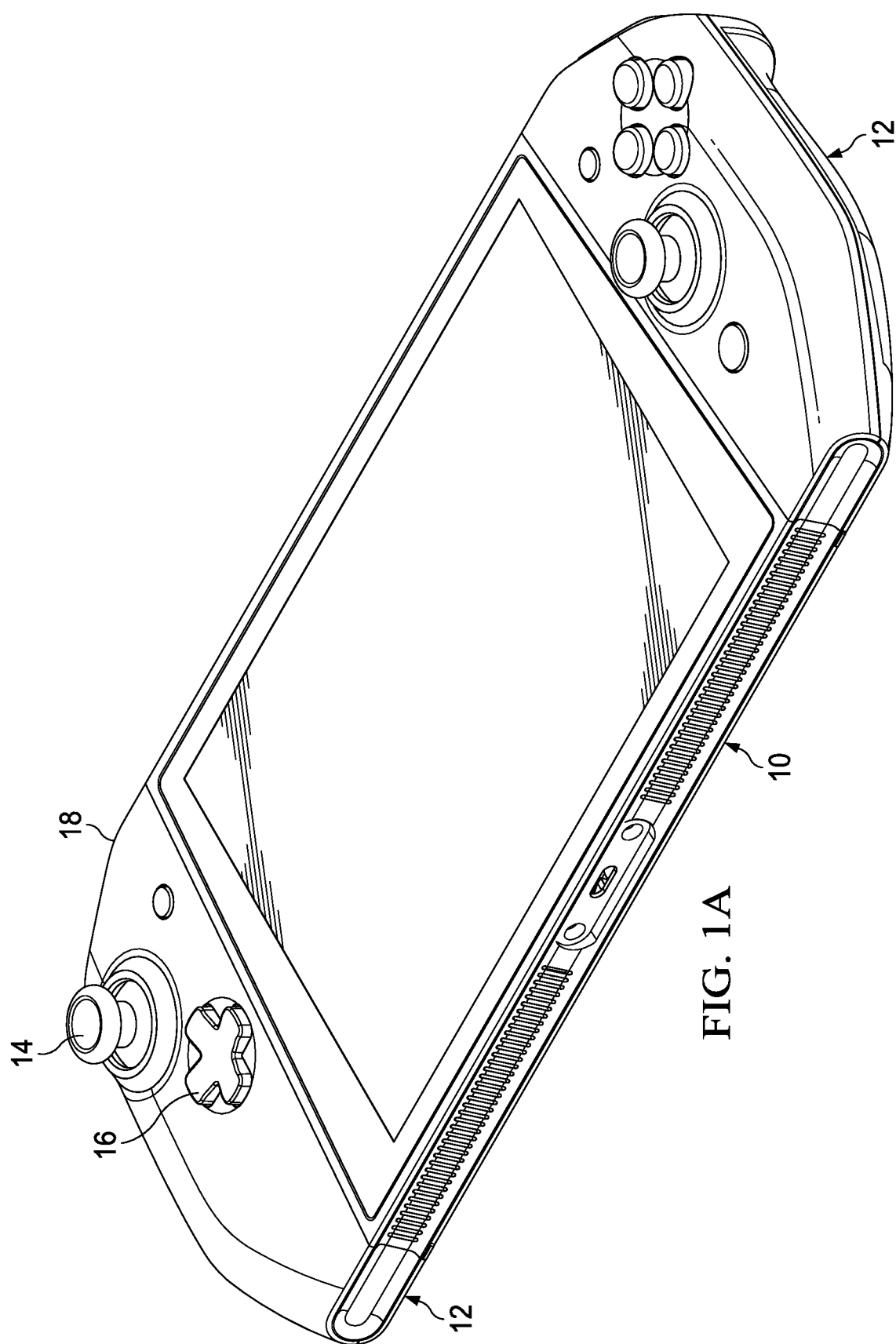

Referring now to FIGS. 1A, 1B, 1C and 1D, a portable information handling system 10 is depicted configured with detachable game controllers 12 in handheld and peripheral configurations. FIG. 1A depicts information handling system 10 in a handheld configuration having a first game controller 12 detachably coupled to a left side surface and a second game controller 12 detachably coupled to a right side surface. Each game controller 12 includes a joystick 14 extending out from an upper surface, input buttons 16 disposed at the upper surface and one or more triggers 18 at a top side surface aligned for finger placement in the grasp of an end user. Portable information handling system 10 has a tablet configuration with a display integrated at the upper surface to present information as visual images. In the handheld configuration of the example embodiment, game controllers 12 couple in a robust manner at the opposing sides of portable information handling system 10 to support an end user grasp so that input devices of each game controller 12, such as joystick 14, buttons 16 and trigger 18, are conveniently exposed to accept end user inputs while the end user grasps each game controller 12. For instance, an end user playing a gaming application on portable information handling system 10 has game controllers 12 available and makes inputs to the game while holding portable information handling system 10.

Figure 1B:
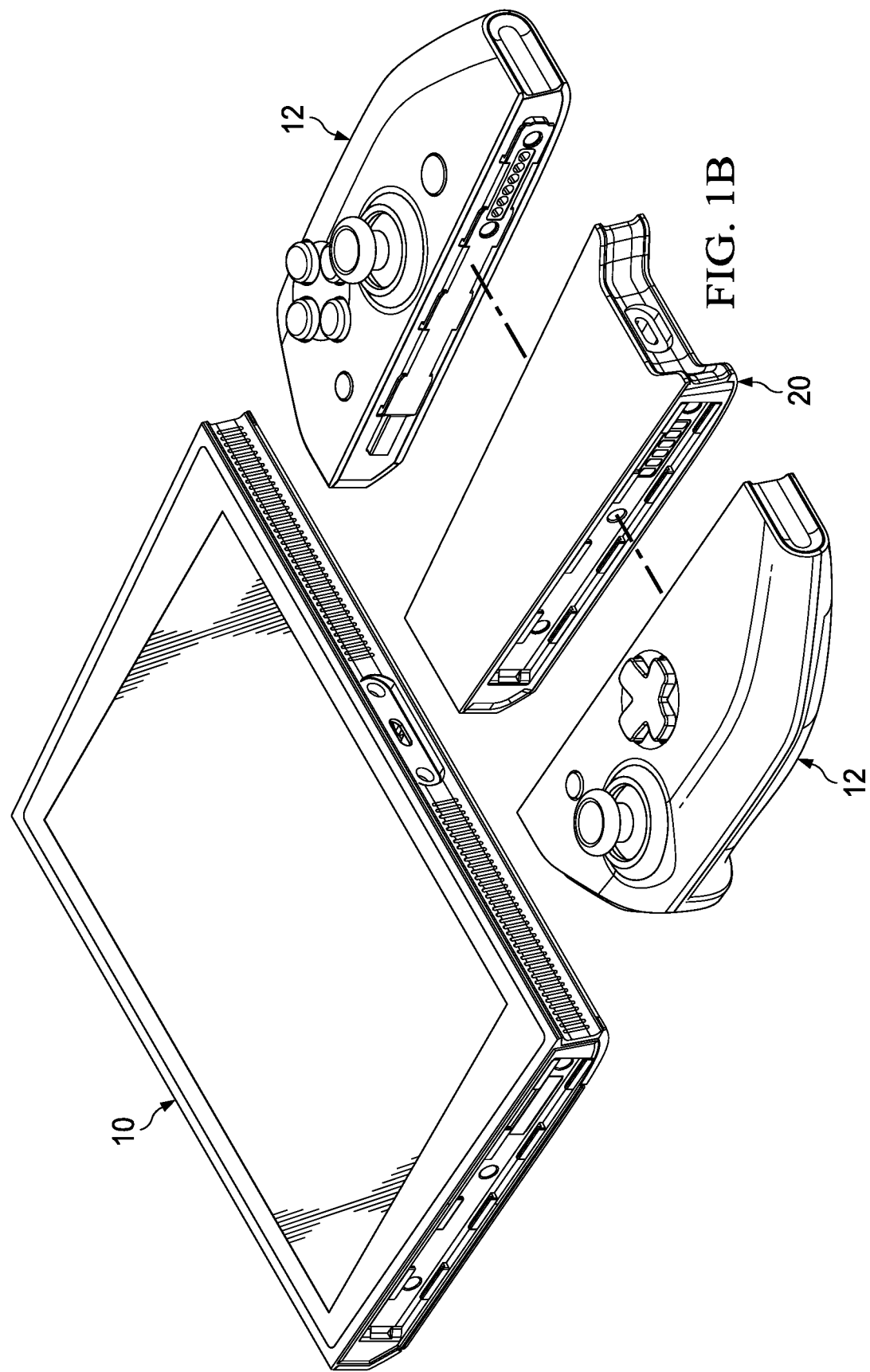

FIG. 1B depicts game controllers 12 detached from portable information handling system 10 in preparation of operation as a peripheral input device. In the example embodiment, game controllers 12 couple to a bridge 20 in the same manner as the couple to portable information handling system 10 so that bridge 20 acts as an intermediary to communicate game controller inputs to portable information handling system 10. For example, as is described in greater detail below, game controllers 12 engage with a sliding motion to bridge 20 to align opposing wired interfaces between each game controller to a wired interface on each opposing side of bridge 20. Attachment structures of game controllers 12, bridge 20 and portable information handling system 10 each include the opposing wired interfaces so that game controllers 12 interchangeably interface with bridges and information handling systems to provide inputs to the information handling system gaming application. When game controllers 12 couple to an information handling system, inputs from the input devices are communicated directly to the information handling system through the wired interface, such as an I2C interface. When game controllers 12 couple to a bridge 20, inputs from the input devices are communicated indirectly to information handling system 10 first through the wired interface to bridge 20 and then from bridge 20 to information handling system through a separate interface, such as a wireless personal area network (WPAN) like Bluetooth, or a cabled interface like a Universal Serial Bus (USB) cable and hub.

FIG. 1C depicts first and second game controllers 12 detachably coupled at opposing sides of a bridge 20 to build a composite game controller that interacts as a peripheral with portable information handling system 10, such as by communicating game controller inputs to information handling system 10 through wireless signals. In the example embodiment, portable information handling system 10 has a stand 22 that extends out from the rear of its housing to hold portable information handling system 10 in an elevated viewing position. Stand 22 rotates about a hinge in the bottom portion of information handling system 10 to open from the top out, thus reducing space used by stand 22. In this stand-alone mode of operation, portable information handling system 10 presents information as visual images based upon inputs from the composite controller assembly 28 through the wireless interface. Portable information handling system 10 is not restricted to executing gaming applications and may perform other processing tasks with interactions from other input devices, such as a keyboard and mouse. In addition, portable information handling system 10 may support presentation of information as visual images at peripheral displays 26, such as through a display cable interface 24. During gaming operations, a variety of interactions may be provided when a peripheral display 26 is available, such as using the integrated display to present configuration or other information while providing the game user interface at peripheral display 26. Similarly, if a peripheral display 26 is interfaced while game controllers 12 couple directly to portable information handling system 10, the end user may present the gaming application user interface at peripheral display 26 while operating game controllers 12 in the handheld mode depicted by FIG. 1A and presenting configuration or other supporting information at the integrated display of portable information handling system 10. In the example embodiment, portable information handling system 10 is built into a housing having a trapezoidal shape of parallel top and bottom sides with the top side of a shorter length than the bottom side. The trapezoidal shape aids system stability in a stand-alone resting mode and provides a physical indication to an end user of the housing orientation, such as to aid attachment of game controllers 12 in low light conditions in an ergometric manner readily understood by an end user.

Figure 1D:
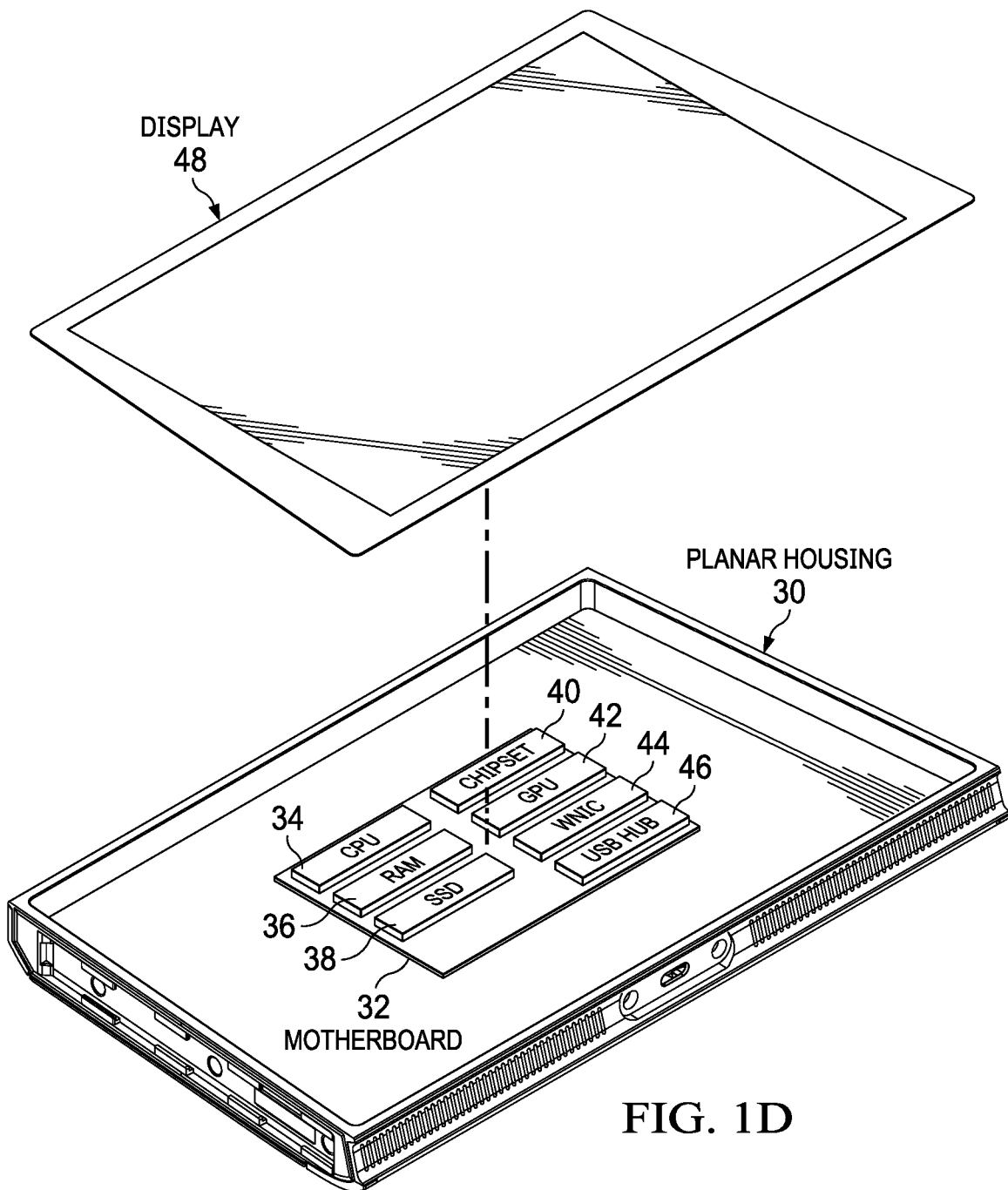

FIG. 1D depicts an exploded view of portable information handling system 10 with example processing components that cooperate to process information. Generally, portable information handling system 10 has a tablet configuration that executes instructions to present information as visual images at an integrated display. For example, a planar housing 30 holds a motherboard 32 that interfaces plural processing components that cooperate to process information. In the example embodiment, motherboard 32 interfaces a central processing unit (CPU) 34 that executes instructions to process information with a random access memory (RAM) 36 that stores the instructions and information. A solid state drive (SSD) 38 or other persistent storage device stores instructions during power down states that are retrieved to RAM 36 at power up. For example, an operating system, such as WINDOWS, stored in SSD 38 is retrieved to RAM 36 to manage interactions with physical devices by applications stored in SSD 38, such as gaming applications executable by CPU 34. A chipset 40 interfaces with CPU 34 to manage physical operations of CPU 34, such as clock speed, graphics interactions and memory accesses. A graphics processing unit (GPU) 42 interfaces with CPU 34 to accept visual information generated by the operating system and application for further processing that defines pixel values for presentation of a visual image at integrated display 48 and peripheral display 26. A wireless network interface card (WNIC) 44 interfaces with CPU 34 to provide wireless communication, such as through WiFi, Bluetooth and other wireless interfaces. A USB hub 46 supports cable interfaces through a USB protocol, such as to communicate input device and graphics information with external devices. A display 48, such as a liquid crystal display (LCD) or organic light emitting diode (OLED) display, is disposed over the processing components and interfaced with GPU 42 to present information as visual images. The example embodiment depicts only some of the various processing components that might be used in portable information handling system 10, and various configurations of processing components may be selected in alternative embodiments to achieve desired performance goals.

In one example embodiment, planar housing 30 may have a relatively thick construction as compared with conventional tablet information handling systems to provide a robust system that withstands exertions common in gaming application input devices. For instance, the Z-axis or thickness relative to the plane of planar housing 30 may provide additional space to include active cooling devices, such as a cooling fan for rejecting thermal energy created by power dissipation at CPU 34 and GPU 42. Active thermal rejection increases the capabilities of the CPU and GPUs that may be selected for processing information. In particular, a power GPU 42 provides enhanced visual processing that supports a positive end user experience in a gaming environment. In various embodiments, planar housing 30 may have varied dimensions that offer a balance between handheld and stationary usage cases and ergonomics versus portability.

Generally, portable information handling system 10, game controllers 12 and bridge 20 cooperate to provide a flexible solution for a high quality gaming experience with optimal processing capabilities. The composite controller assembly 28 is implemented with a three-piece assembly having two game controllers 12 that unite to a bridge 20 to become a single functional composite game controller operative as a peripheral input device. Game controllers 12 detachably couple to either bridge 20 or information handling system 10 with an interchangeable attachment structure that readily converts the system between handheld and stationary operating modes. In the stationary use case, composite controller assembly 28 interfaces as a separate peripheral with information handling system 10 through wired and/or wireless connectivity while information handling system 10 acts as a stationary "head" device held in a viewing position by stand 22. Composite controller assembly 28 provides a slim ergonomically-performant controller unit that can support inputs to other types of information handling systems. When assembled to information handling system 10, game controllers 12 convert information handling system 10 into a robust handheld gaming unit with convenient grips and end user input devices disposed in proximity to the end user's grasp.

As an example of a usage scenario, an end user powers up information handling system 10 in the handheld configuration depicted by FIG. 1A. The end user end user, using a launcher such as Valve's Steam in Big Picture mode, initiates a game (gaming application). The gaming application presents the gaming user interface at integrated display 48. The handheld mode allows the user to play the game while mobile, thus giving the user the flexibility of playing while walking around his home or while traveling. Once the end user reaches a location to play in a stand alone mode, the end user removes game controllers 12 from opposing sides of information handling system 10, such as with a sliding detachment, places information handling system 10 on a support surface, such as elevated by stand 22, and attaches game controllers 12 to bridge 20 to assemble a composite controller assembly 28. The end user may then continue the game application with inputs made from game controllers 12 through bridge 20 to information handling system 10.

Figure 2A:
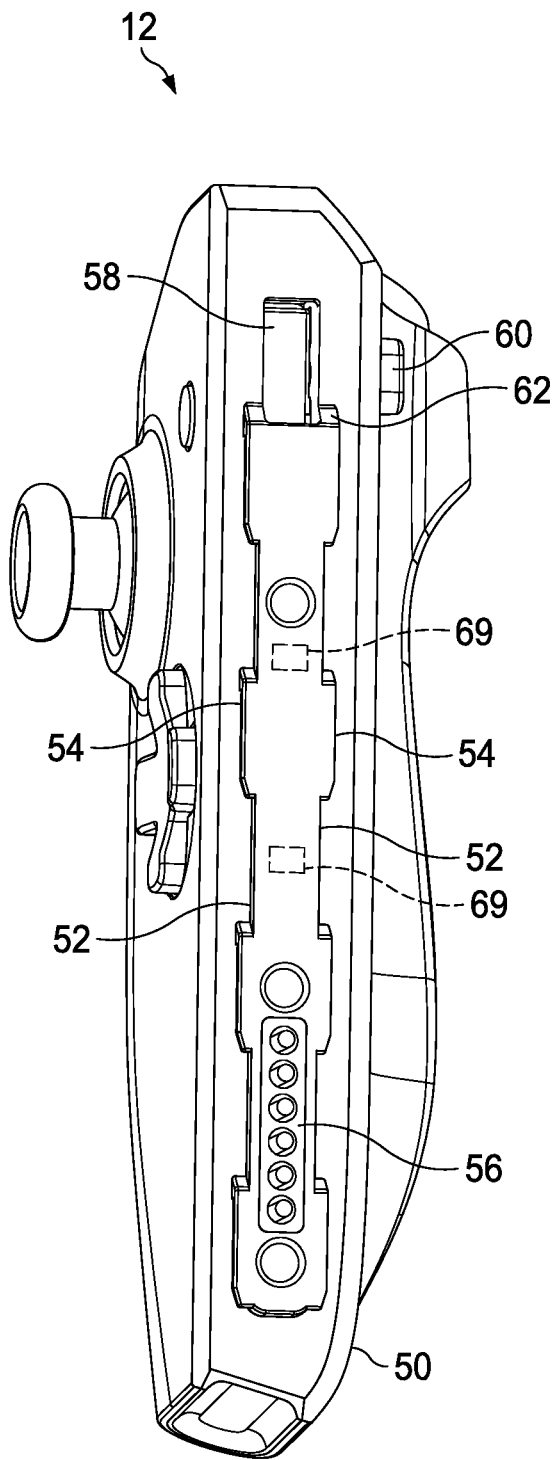
FIGS. 2A and 2B depict a side perspective view of the game controller and bridge to illustrate an example embodiment of an attachment structure to couple the game controllers to an information handling system and bridge.
Figure 2B:
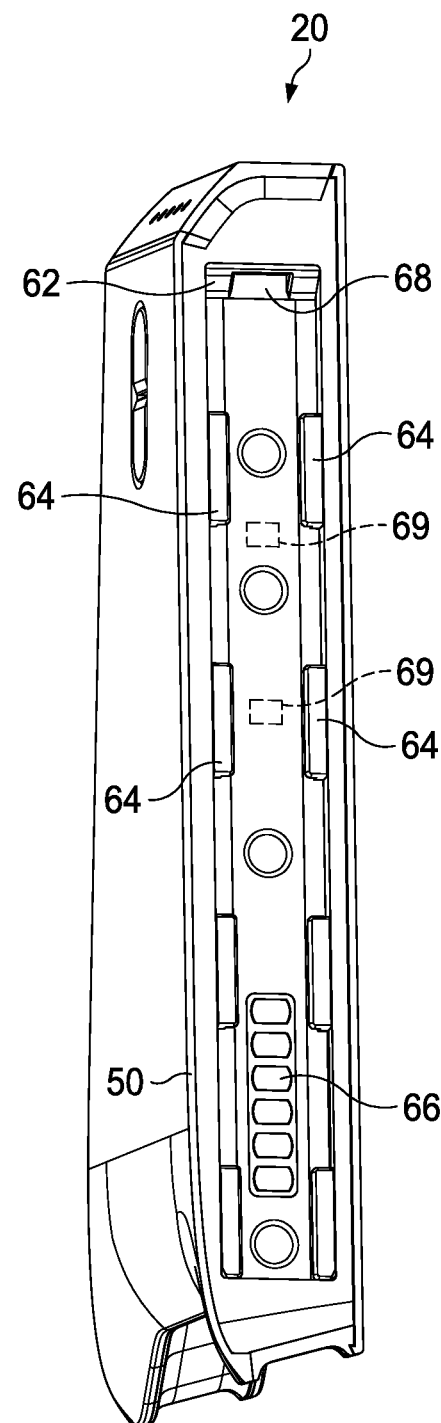

Referring now to FIGS. 2A and 2B, a side perspective view of game controller 12 and bridge 20 illustrate an example embodiment of an attachment structure 50 to couple game controllers 12 to information handling system 10 and bridge 20. Attachment structure 50 provides a robust mechanical interconnect between game controller 12 and information handling system 10 and bridge 20 that withstands forces commonly associated with gaming devices with ready detachment and attachment as desired by an end user. Solid coupling by attachment structure 50 prevents rattle and/or wobble between proximate housing that can disrupt wired communication signals passing through wired interfaces disposed within attachment structure 50. Features of attachment structure aid proper alignment during coupling and discourage attempts to couple misaligned housings or reverse install a right/left handed game controller on an opposite side of an information handling system 10 or bridge 20. When game controllers 12 attach to a bridge 20 or information handling system 10, a clean appearance is provided without gaps, holes or raw exposed mechanical features. These advantages are provided with a number of different attachment structures as described in greater detail below.

The example embodiment of FIGS. 2A and 2B has a magnetically guided short-throw "backbone" style rail coupling to mechanically couple game controller 12 to bridge 20. At game controller 12, attachment structure 50 has opposing lips 54 that define a rail with plural opposing slots 52. Within a cavity defined by the opposing lips, a pogo pin connector 56 exposes plural pogo pins that provide a wired interface to processing components disposed within game controller 12. At the opposing length of the cavity from pogo pin connector 56, a latch 58 is disposed with an actuation button 60 exposed at the bottom outer surface of game controller 12 and ramp feature 62 formed in the cavity leading towards latch 58. Attachment structure 50 of bridge 20 has opposing plural tabs 64 and a connector pad 66 disposed in a cavity defined between the opposing tabs 64. In one example embodiment, an anti-wear strip, such as. Teflon, is located at the bottom of the slot to reduce wear from sliding and tighten the fit of attachment structure 50. Tabs 64 are sized to fit within slots 52 and then slide under behind lips 54. A latch connector 68 disposed in the cavity defined by opposing tabs 64 couples to latch 58 as attachment structure 50 slides to an engaged position having pogo pin connector 56 aligned with connector pad 66. Ramp feature 62 aids in a tight connection of attachment structure 50 by pressing tabs 64 out and against the back side of lips 54 as sliding engage of attachment structure 50 completes with latch 58 coupling to latch connector 68 and aids with ejection of game controller 12 by facilitating a sliding ejection motion at latch release activation. In an alternative embodiment, attachment structure 50 may be reversed so that tabs 64 are disposed on game controller 12 and slots 52 are disposed on bridge 20.

To help ensure proper alignment of attachment structure 50, one or more magnets 69 are embedded in each of opposing sides of attachment structure 50 to attract for proper sliding alignment and/or repel if an improper alignment is attempted. Magnetic polarity of embedded magnets 69 is configured to selectively repel and/or attract attachment structure 50 when misalignment or proper alignment is attempted. For instance, an embedded magnet 69 located in a slot 54 is configured to have a polarity opposite that of a magnet located at a tab 64 that aligns with it so that game controller 12 biases into the correct alignment during attachment. A second magnet at a proximate slot 54 has an opposite polarity to the first magnet so that an attempt to couple game controller 12 with the tab 64 having the same polarity will repel the game controller 12 away from bridge 20. A second magnet may also be included in bridge 20 with an opposite polarity of the second magnet of game controller 12 so that the attraction and repel interactions are reinforced along the length of attachment structure 50. In one embodiment, polarity configurations are arranged at left and right side game controllers 12 and bridge 20 so that an attempt to couple a left side game controller to a right side of bridge 20 will provide a repelling force.

One advantage of attachment structure 50 in the example embodiment is that the short-throw arrangement of slots 52 and tabs 64 allow a sliding motion to attach game controller 12 to bridge 20 that involves only a portion of the length of attachment structure 50. This smaller sliding motion helps to prevent exposure of attachment structure 50 visually after attachment is complete to avoid compromise of the appearance of composite controller assembly 28. In the example embodiment, at the start of the sliding attachment motion, pogo pin connector 56 completely misaligns with connector pad 66 at initial alignment of the correct slot 54 and tab 64 so that pogo pin connector 56 runs across connector pads 66 during a sliding coupling motion resulting in the individual pogo pins of pogo pin connector 56 to contact the individual pads of connector pad 66 in a predictable pattern during attachment. As describe below, this pattern of contacts provides an indication to a processor in bridge 20 of the type of controller housing that is being attached. For instance, some controller housings may include additional peripheral functions that the contact pattern helps to discern before attachment is complete. For instance, game controller 12 may include speakers to enhance sounds or a battery to provide additional battery life to an information handling system. In the example embodiment, attachment structure 50 is depicted at a bridge 20, however, information handling system 10 includes a substantially identical attachment structure has bridge 20 so that game controller 12 interchangeably couples to bridges and information handling systems with a small sliding attachment and detachment motion. In one alternative embodiment, the attachment structure 50 may be reversed so that the opposing lips 52 are integrated in bridge 20 and information handling system 10 with the tabs 64 integrated in game controller 12.

Referring now to FIGS. 3A, 3B and 3C, a side perspective view depicts an alternative embodiment of an attachment structure 50 that couples a game controller 12 to a bridge 20 or information handling system 10. In the example embodiment, attachment structure 50 has a dual guide feature 72 disposed at the side surface of game controller 12 that fit into dual guides 70 formed in bridge 20 and information handling system 10. Dual guide feature 70 provides a gross to fine alignment with a narrow region of each feature 72 fitting into an enlarged region of each guide 70 that then slides so that the narrow region of each guide feature 72 engages under the narrow region of each guide 70. In the example embodiment, only one of the guide features 72 bottom out on sliding engagement with the guide 70 so that predictable alignment is achieved. Upon a completed sliding motion, latch 58 extends to engage in latch opening 68 with a plug 76 wired interface contacting a socket 74 wired interface. FIG. 3C illustrates an example embodiment of latch 58 that biases upwards and out of game controller 12 under the influence of a biasing device 78, such as a spring. A press at latch button 60 overcomes the biasing force so that latch 58 levers against game controller 12 to withdraw from latch opening 68. Attachment structure may be constructed from aluminum or a hard plastic to resist wear and lubricated with a Teflon material to reduce friction during the sliding motion.

Figure 4:
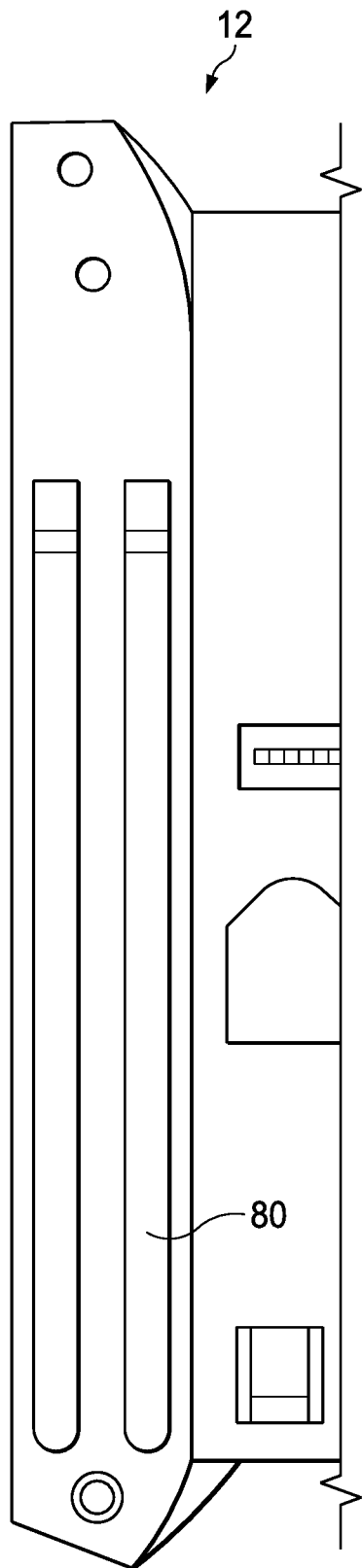
FIG. 4 depicts a side perspective view of an alternative embodiment of an attachment structure that couples a game controller to a bridge or information handling system.

Referring now to FIG. 4, a side perspective view depicts an alternative embodiment of an attachment structure that couples a game controller to a bridge or information handling system. The example embodiment provides a pair of opposing rails 80 with a double angled structure in which alignment is facilitated with an initially loose fit at an attaching member that slides down the rails towards a tighter fit when a latch locks game controller 12 in position. The long throw rail approach reduces a risk of misalignment, however, the longer sliding motion is less convenient for an end user.

Figure 5:
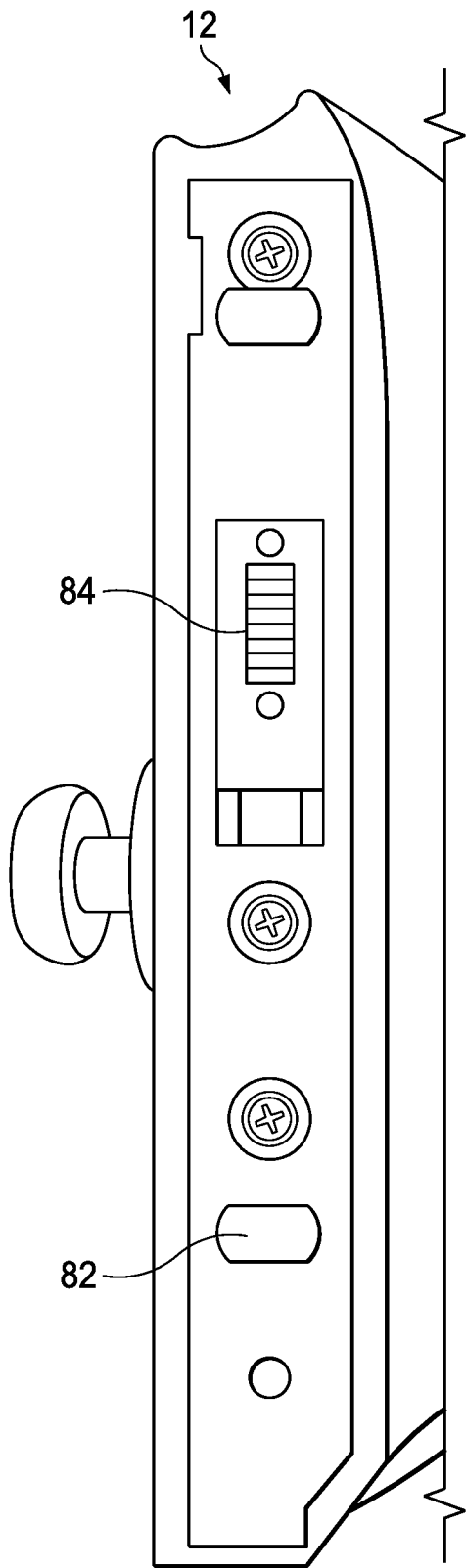
FIG. 5 depicts a side perspective view of an alternative embodiment of an attachment structure that couples a game controller to a bridge or information handling system.

Referring now to FIG. 5, a side perspective view depicts an alternative embodiment of an attachment structure that couples a game controller to a bridge or information handling system. Plugs extending from game controller 12 fit into openings of bridge 20 and slide to engage. A sliding connector 84 engages with a fixed connector of the bridge and slides relative to game controller 12 to remain interfaced with the bridge connector during the sliding motion. By sliding connector 84 during the coupling of game controller 12, wear effects on the electrical connector is reduced over time since the pins remain engaged through the sliding motion of attachment.

Figure 6:
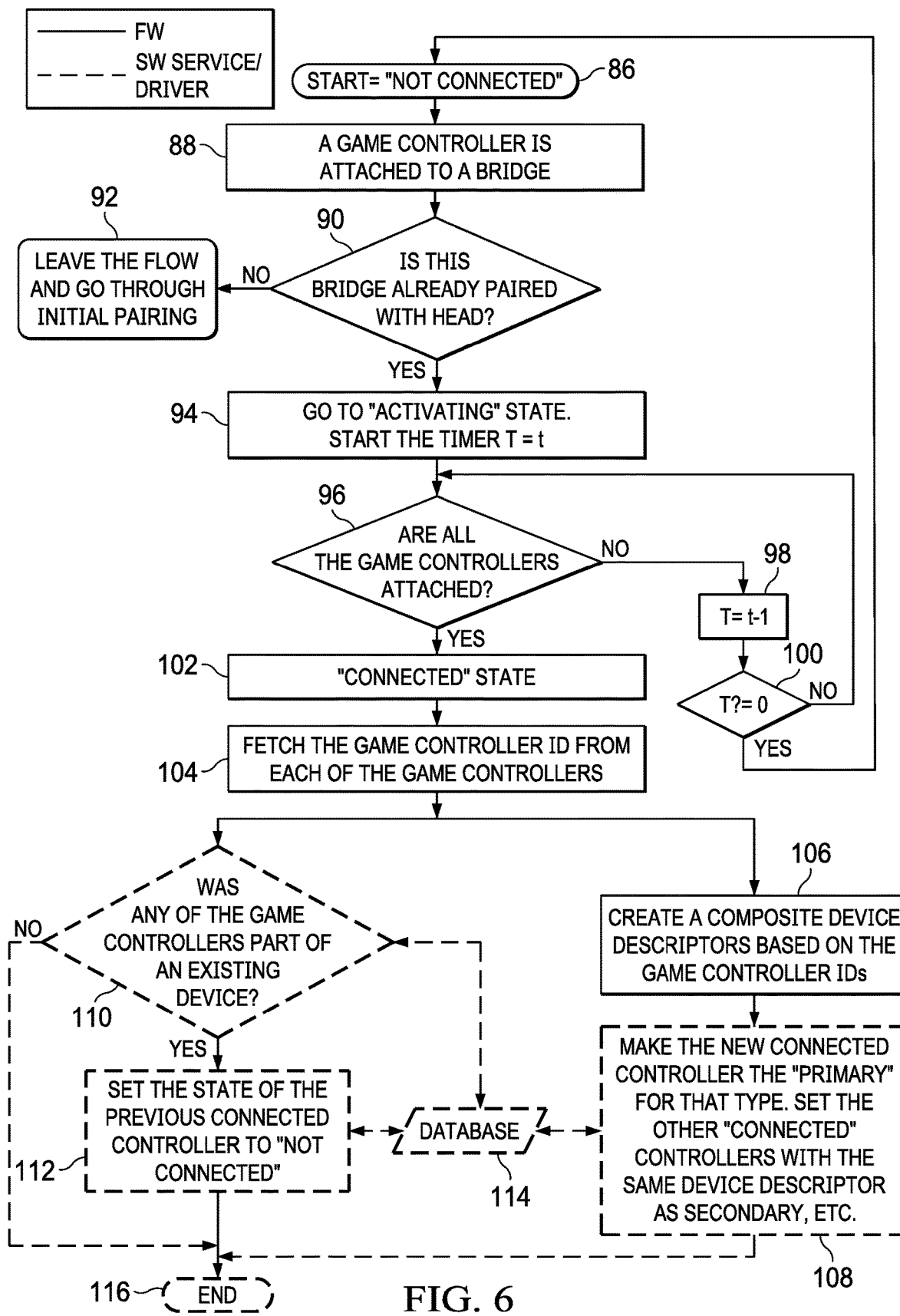
FIG. 6 depicts a flow diagram of a process for tracking game controllers to accept inputs at an information handling system as game controllers attach and detach at an information handling system and bridge.

Referring now to FIG. 6, a flow diagram depicts a process for tracking game controllers to accept inputs at an information handling system as game controllers attach and detach at an information handling system and bridge. In such a situation, the end user might experience delays related to pairing of the bridge before inputs from the game controller are provided to the gaming application and prioritization of different potential gaming inputs could become random or game specific behavior Although detachable game controllers 12 provide improved end user flexibility for selection of an input configuration to interact with a game executing on an information handling system, in a gaming environment plural game controllers and bridges may be available to input to an information handling system, which can result in confusion regarding which inputs should be used. For example, an end user might detach a game controller from an information handling system and couple the controller to any of plural nearby bridges to interact wirelessly with a gaming application. In such a situation, the end user would experience delays related to pairing of the bridge before inputs from the game controller are provided to the gaming application and prioritization of different potential gaming inputs would be random or game specific behavior. Further, where game controllers 12 have different configurations of hardware, such as integrated speakers and alternative input devices, attachment to a bridge would involve additional delays as hardware specific configuration information is exchanged between the bridge and information handling system. In a typical gaming environment, these configuration steps can potentially face additional confusion where multiple wireless devices are available during pairing discovery. In one example embodiment, a safety feature disables functionality for unknown game controller identifiers to help manage unexpected or third party controllers that are detected.

FIG. 6 depicts logic that tracks game controllers that make inputs to an information handling system to manage different configurations that include a direct coupling of a game controller to the information handling system or indirect communication of the game controller with the information handling system through a bridge. One technique that aids in correct association of an end user with a game controller is to track end user association based upon a game controller unique identifier for each game controller associated with end user inputs. For instance, during a physical coupling with an information handling system, the unique identifier of the game controller is retrieved to the information handling system and stored with a wireless pairing profile. Similarly, during a wireless or USB coupling of a game controller with an information handling system through a bridge, the game controller unique identifier is retrieved to the information handling system and stored to aid tracking of the composite controller assembly that includes the game controller. Once pairing information is stored at the information handling system, wireless connectivity with a game controller is provided by including the game controller unique identifier in bridge pairing and advertising packets. During a re-configuration of a game controller between direct communication and indirect communication through a bridge, "activate" and "deactivate" states are included with conventional wireless connection state machines so that rapid and seamless game controller and bridge swapping are supported. In addition, composite controller assembly descriptors are defined that include each combination of identifiers associated with each game controller, such as where multiple game controllers are swapped in various combinations with multiple bridges to interface with an information handling system. In this manner, swapping between game controller input devices is managed through identification of the game controller unique identifier and component composition with transitions between configurations simplified through a deactivate state.

The process starts at step 86 with a start "not connected" state executing at a bridge processor. At step 88, a game controller is attached to the bridge, such as with the attachment structure described above that interfaces the bridge and game controller wired interfaces. At step 90, the bridge firmware determines if the bridge has paired with a "head" information handling system. If not, the process continues to step 92 to leave the configuration process flow and perform an initial pairing with an information handling system. In one example embodiment, advertising and pairing are automatically initiated in response to assembly of a game controller to the bridge. If the bridge is already paired, the process continues to step 94 to transition to an activating state and initiate an activating timer. The activating state proceeds to step 96 to determine if the bridge has both game controllers coupled as "wings" and, if so, ends with a connected state at step 102. If the bridge does not have both controllers connected, the activating state continues to step 98 to increment down the timer and then to step 100 to determine if the timer has expired at a count of zero. If the timer has not expired, the process returns to step 96 to continue the activating state. If the timer expires at step 100, the process returns to step 86 to restart when another game controller is coupled to the bridge.

Once the bridge firmware has transitioned to the connect state at step 102, the process continues to step 104 to retrieve the unique identifier from each game controller wing coupled to the bridge. Once the game controller unique identifiers are retrieved, the firmware proceeds to step 106 to create a composite descriptor of the controller assembly based upon both game controller wing unique identifiers. At step 108, the composite descriptor and the game controller unique identifiers are provided to the information handling system, which defines the composite controller as the "primary" device for the game controller type and sets other connected composite game controllers as secondary. In addition, at step 104 the process continues to step 110 to determine from the unique identifiers whether any of the game controllers were previously attached to the bridge as part of an existing composite device or as a directly connected device. If so, the process continues to step 112 to set the previously connected device to a "not connected" state. Once the unique identifiers are associated with the composite assembly at step 108 and step 112, the game controller database is updated at step 114 and the process ends at step 116.

Figure 7:
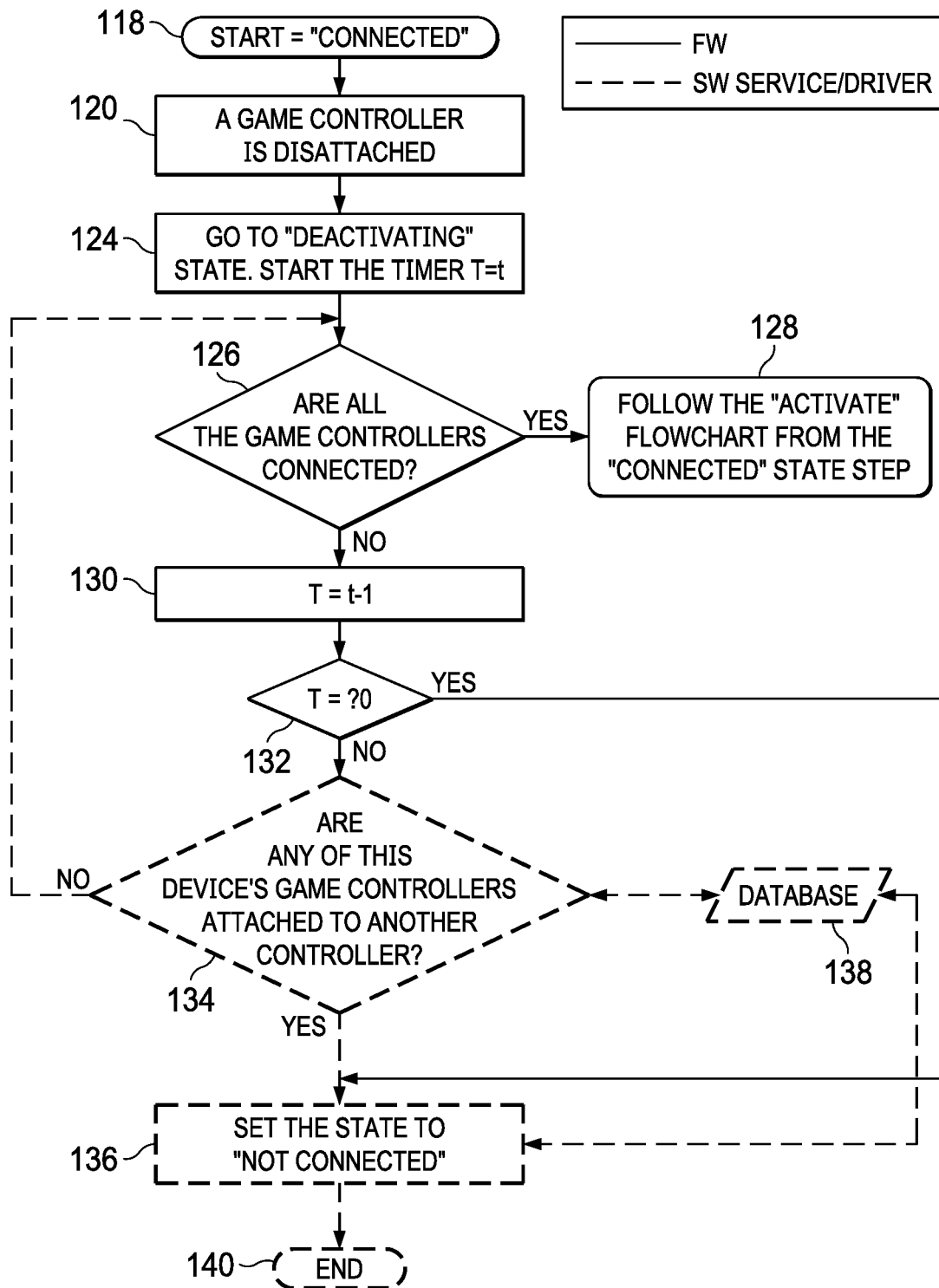
FIG. 7 depicts a flow diagram of a process for managing deactivation of game controllers at detachment from a bridge.

Referring now to FIG. 7, a flow diagram depicts a process for managing deactivation of game controllers at detachment from a bridge. The process starts at step 118 in a connected state having first and second game controllers attached on opposing sides of a bridge. At step 120, detachment of a game controller wing from the bridge is detected. The process continues to step 124 to transition the bridge firmware to a "deactivating" state and start a timer. At step 126, a determination is made of whether all game controller wings are attached to the bridge and, if so, the process continues to step 128 to proceed to activation at step 102 of FIG. 6. If both game controller wings are not connected at step 126, the process continues to step 130 to decrement the timer and step 132 to determine if the timer has expired at zero. If the timer has expired, the process continues to step 136 to set the state to "not connected," to update the database at step 138, and to end at step 140. If the timer has not expired, the process continues to step 134 to determine if any of the bridge's game controller wings are attached to another bridge. If not, the process returns to step 126. If a game controller is determined as connected to another bridge, the process continues to step 136 to set the bridge to a not connected state, to update the database at step 138 and end at step 140.

Figure 8:
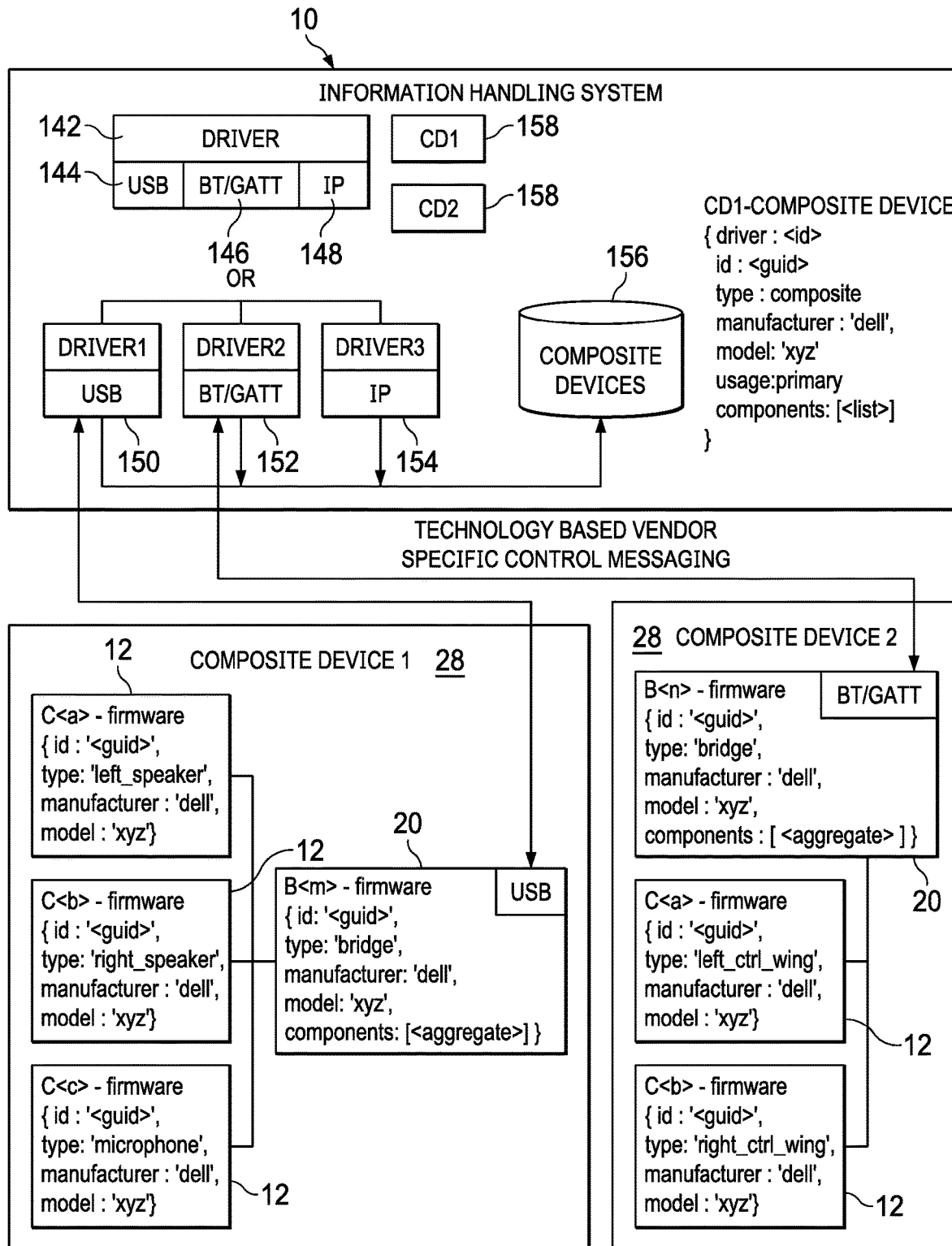
FIG. 8 depicts a logical block diagram of a storage structure for tracking game controllers at an information handling system and bridge.

Referring now to FIG. 8, a logical block diagram depicts a storage structure for tracking game controllers 12 at an information handling system 10 and bridge 20. Information handling system 10 includes operating system drivers 144 and/or device specific drivers 150, 152 and 154 that interact with a composite device database 156 to present a composite device descriptor of composite controller assemblies 28 for use by an application executing on information handling system 10, such as a gaming application. In the example embodiment, driver support is provided for communication with bridges 20 through USB, Bluetooth GATT and Internet Protocol. Various software and firmware structures and interactions may be used to coordinate communication between composite controller assemblies 28 and information handling system 10. For instance, drivers may be implemented with multiple separate driver modules or one single monolithic driver. Composite device database 156 may be implemented as a file, a hive registry, an SQL database or other formats. Data representations may include binary, text or other formats. In a monolithic driver embodiment, a virtual device can be represented to allow transport and other elements of the devices to be changed without remunerating the virtual device.

In operation, each bridge 20 boots at power up, determines its connected components, such as by reading identification information of attached game controller 12, and aggregates its identification with the connected component identifications to define a composite identity descriptor. Bridge 20 then interfaces with information handling system 10 through an available communication medium, such as USB, Bluetooth or IP, and registers with information handling system 10. A monolithic driver 144 or an individual driver associated with USB 150, Bluetooth 152 or IP 154, interrogates the bridge 20 of the composite device 28, such as through vendor specific control messaging, and obtains the composite device identifier. The driver then reads composite device database 156 to see if the composite device 28, bridge 20 or game controllers 12 are included as devices previously in use at information handling system 10. If so, the driver in contact with the composite device interfaces with any companion drivers to remove the device from its connected devices. The connected driver then registers the composite device in composite database 156 and stores its identity descriptor. As components are added or removed, such as different bridges or changes to game controllers at different bridges, updated identifier information is provided through its active driver to maintain consistent tracking of bridges and game controllers interfaced with information handling system 10. In one example embodiment, composite database 156 includes tracking of bridges and game controllers with a "pause" state that indicates a transition between connected and disconnected states, such as when a game controller is detached from information handling system 10 or bridge 20 to attach to a different device. In some cases, the MCU 162 on information handling system 10 and game controller(s) 12 directly connected to that MCU 162 represent the game controller(s) 12 as a composite device to the database via USB. In such an example embodiment, MCU(H) 162 of information handling system 10 could be managed the same way as the bridges 20 within the database, such as for example transitioning to different states depending on game controller 12 identifier tracking. Thus, for instance, game controller interactions with bridges and information handling systems are trackable as connected, disconnected, paused, active, inactive and other states so that transitions of composite devices, to include information handling system and controller composite devices, are actively managed to provide smooth operating transitions, such as during reconfiguration of game controllers between different bridges and information handling systems.

Figure 9:
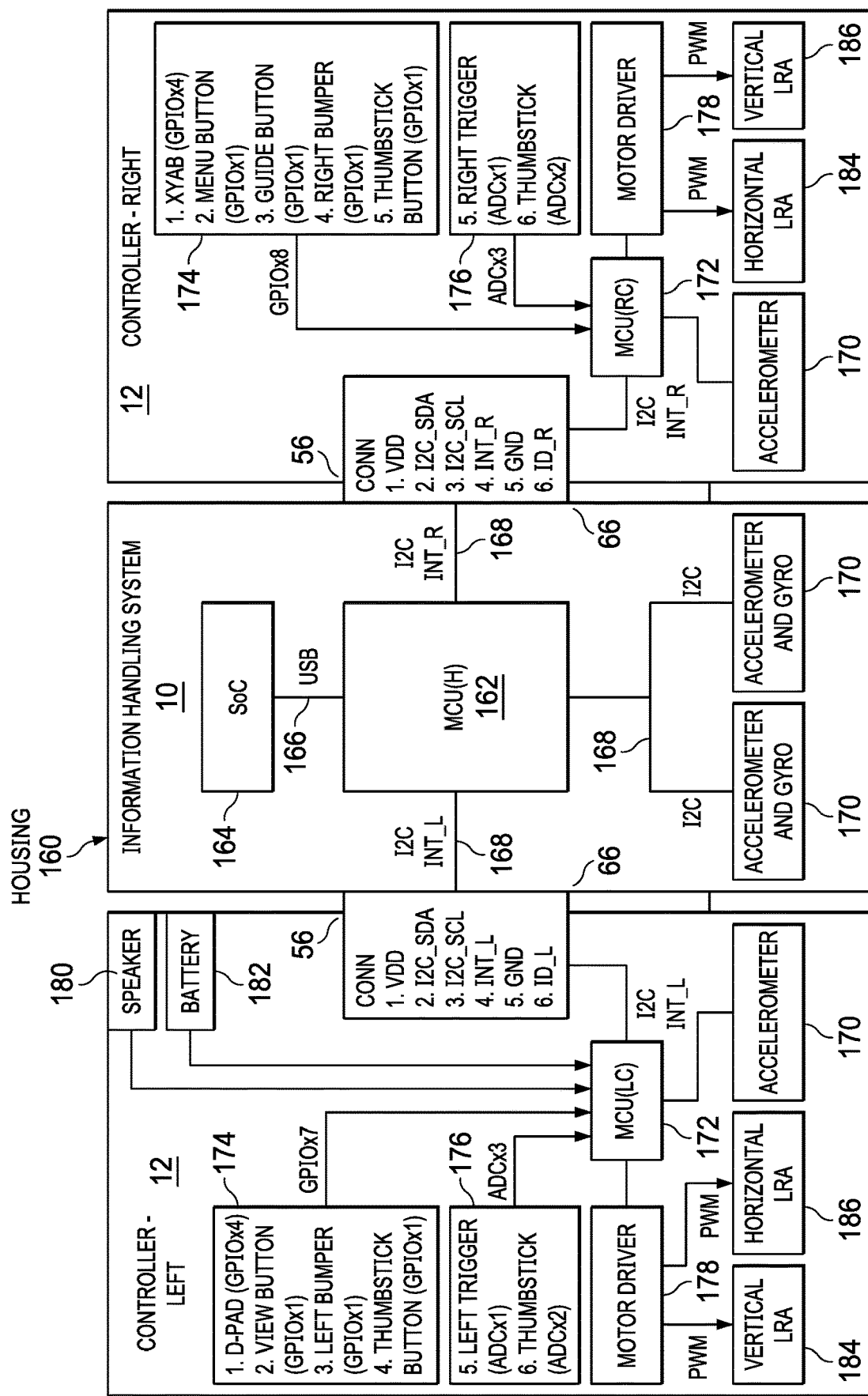
FIG. 9 depicts a circuit block diagram of an example embodiment of an information handling system attached at opposing sides of a housing to first and second game controllers for direct communication through a wired interface.

Referring now to FIG. 9, a circuit block diagram depicts an example embodiment of an information handling system 10 attached at opposing sides of a housing 160 to first and second game controllers 12 for direct communication through a wired interface. In the example embodiment, information handling system 10 includes processing components within a housing 160 having an attachment structure as described above to attach to a game controller 12 housing. The example embodiment depicts a microcontroller unit (MCU) 162 that interfaces with connector pads 66 and accelerometers 170 through an I2C interface 168. A USB interface 166 is provided to a system on chip 164 that provides USB hub and wireless communication support. Although the example embodiment depicts an MCU, other types of processors may be used and, in an example embodiment, the system CPU may directly couple to the connector pad 66 instead of communicating through MCU 162. Each game controller 12 includes an MCU 172 that executes embedded code stored in flash memory to monitor for input device inputs and report the inputs through pogo pin connector 56 to information handling system 10. In the example embodiment, input devices include input buttons associated with a joystick 14 and joystick and trigger inputs 176. Other features that may be optionally supported include a speaker 180 that plays audio provided from information handling system 10 and a secondary battery supply 182 that supplements information handling system integrated battery storage. These additional features may be supported, for instance, with additional wired interface pins as described below. In addition to passing inputs to information handling system 10, each game controller 12 includes a motor driver 178 that drives a haptic device to generate a haptic response, such as a vibration, with a drive command, such as pulse width modulation (PWM) or a logical vibration response level. In the example embodiment a vertical linear resonant actuator (LRA) 184 and a horizontal LRA 186 provide haptic feedback or "rumble" to the end user based upon commands communicated from information handling system 10, such as a command for vibration at variable levels in horizontal and vertical orientations. In an alternative embodiment, a single eccentric rotating motor (ERM) or dual ERMs with horizontal and vertical orientation may be used. Accelerometers 170 integrated in information handling system 10 and game controller 12 detects vibration and gyroscopic orientation. As described in greater detail below, the amount of haptic feedback may vary based upon the physical configuration of the game controller, such as using a lower motor speed when in a low weight configuration coupled to bridge 20 and a greater motor speed when in a high weight configuration coupled to information handling system 10. Haptic feedback may also vary based upon the orientation of game controller 12, such as by adjusting the speed of the horizontal versus the vertical motor as orientation detected by gyroscopic function of the accelerometers 170 changes.

Figure 10:
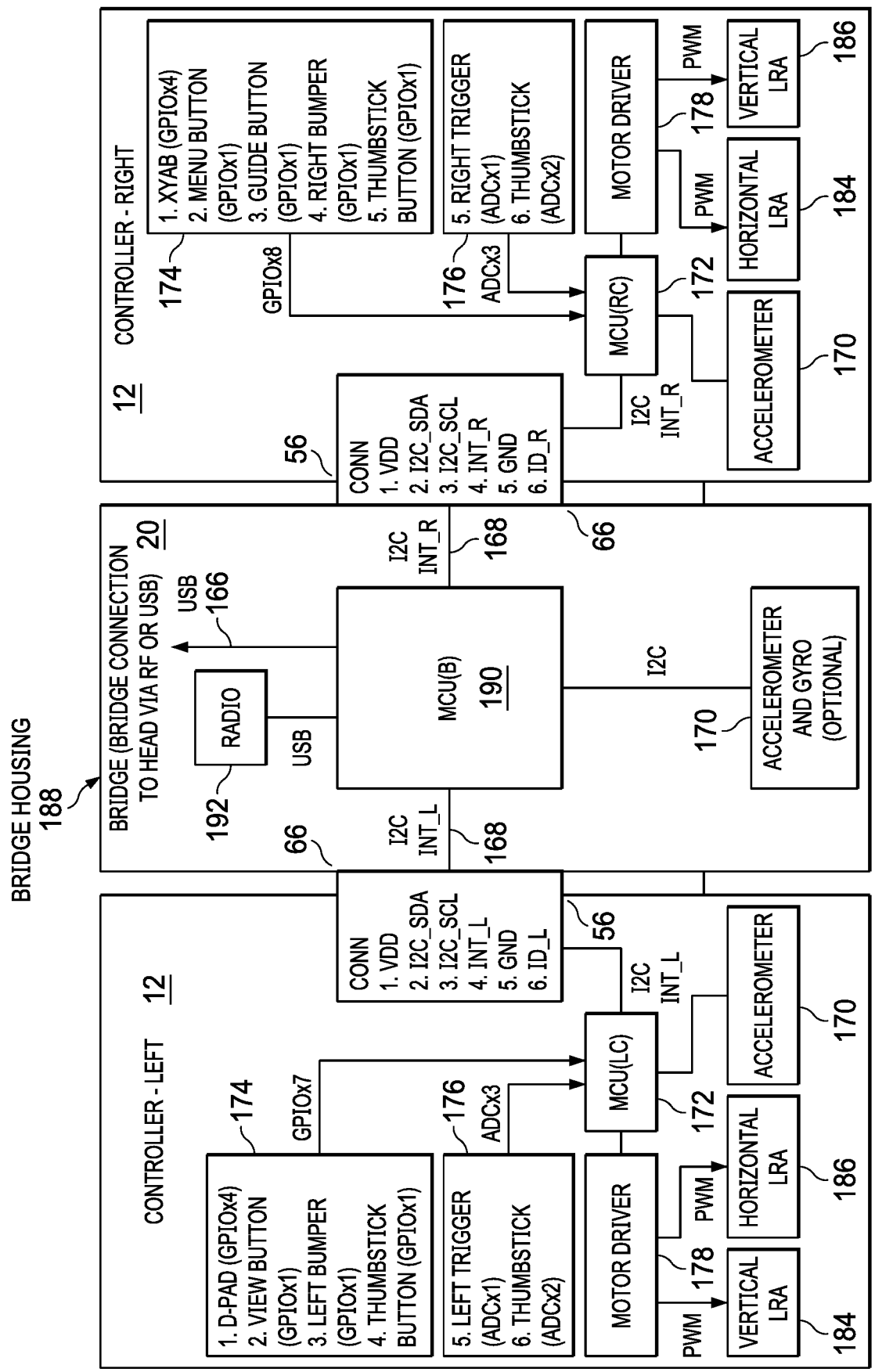
FIG. 10 depicts a circuit block diagram of an example embodiment of a bridge attached at opposing sides of a housing to first and second game controllers for supporting indirect communication of the game controllers with an information handling system.

Referring now to FIG. 10, a circuit block diagram depicts an example embodiment of a bridge 20 attached at opposing sides of a housing to first and second game controllers 12 for supporting indirect communication of the game controllers 12 with an information handling system 10. Bridge 20 includes a bridge MCU 190 that supports communication with an information handling system through a USB interface 166 and a wireless interface supported through a radio 192. MCU 190 interfaces through an I2C interface 168 with an integrated accelerometer 170 and connector pad 66. Bridge 20 communicates with game controllers 12 in a similar manner to information handling system 10 and acts as an intermediary with between game controllers 12 and information handling system 10. For example, as inputs are made at game controller 12, the input are communicated through the wired interface to bridge 20 and then forwarded from bridge 20 to information handling system 10 through a USB cable or wireless interface. Commands from information handling system 10 are similarly intermediated with communications to bridge 20, which forwards the commands to game controller 12, such as to provide haptic feedback. In the example embodiment, the identification and ground pins are located at the bottom of the connectors and the VDD power pin is located at the top so that inadvertent power on is protected against and to aid the timing of power up at a sliding attachment of a controller to an information handling system or bridge.

The distributed logic architecture of FIGS. 9 and 10 provides a flexible game console that adapts to both handheld and standalone use cases by interchangeably attaching game controllers to an information handling system housing and a bridge housing. In the example embodiment, scalability, modularity and responsiveness of game controllers 12 are enhanced by including a processor in each game controller that manages interactions with bridge 20 and information handling system 10. Distributed MCU processing provides a number of advantages. One advantage is responsiveness of game controllers 12 and bridge 20 in communicating game inputs to information handling system. For example, each MCU executes a state machine that rapidly responds to events, such as inputs from a joystick, buttons and triggers and commands to haptic feedback devices. As another example, a scalable low pin count wired interface simplifies communications between game controllers 12 with bridge 20 and information handling system 10. Defining a scalable low pin count interface allows ready attachment between a bridge or information handling system with adaptability for optional functions and hardware interfaces. For instance, event-based state machine management of inputs at a game controller and bridge share an I2C interface that can include support for other hardware through a common link. The low pin count leaves room at the wired interface to add pins for communicating hardware specific information through dedicated links, such as audio information or power transfer from a battery in a game controller to supplement power at an information handling system. The modular approach of separating a composite controller assembly into a bridge and two game controllers enhances reusability of each portion in different assemblies, reuse of common MCU embedded code and reduction of sometimes confusing wireless interfaces by leveraging bridge wireless communications. In one example embodiment, an application programming interface defined for the wired interface supports third party vendor devices to interface with a bridge or information handling system to enhance user options for game controllers and other accessories. To support adaptation to changing hardware and communication capabilities, firmware updates are coordinated across the wired and wireless interfaces with version control logic and malicious code protection as described in greater depth below.

Figure 11A:
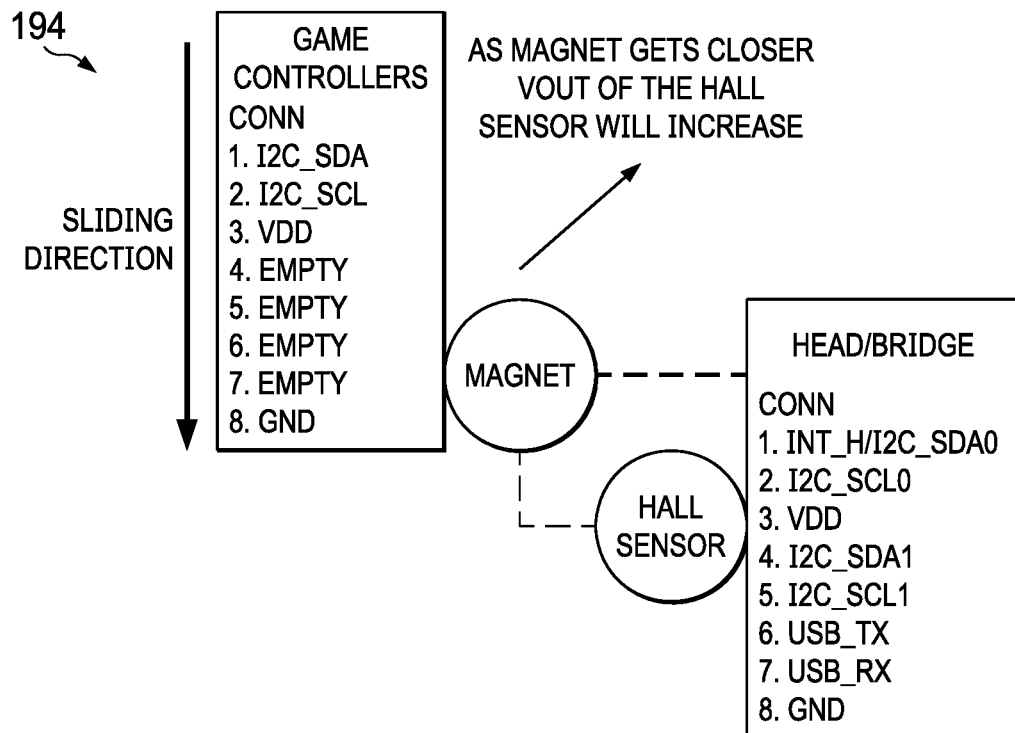
FIGS. 11A, 11B and 11C depict a flow diagram of an example embodiment of identification by a bridge or information handling system of game controller type based upon wired interface contacts during a sliding attachment motion.
Figure 11B:
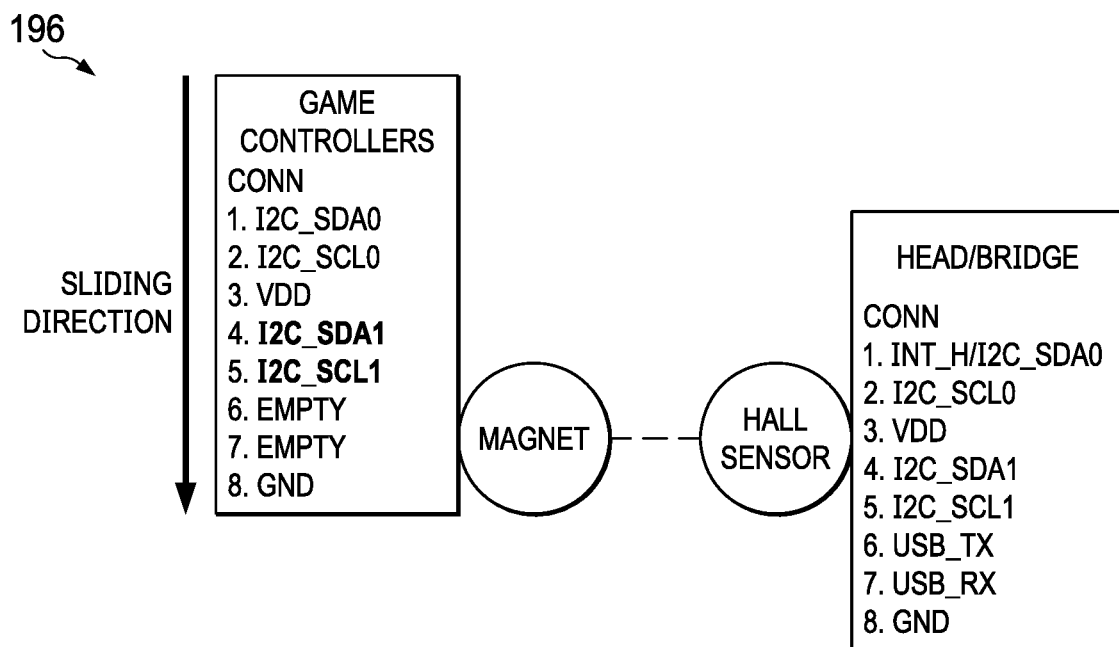
Figure 11C:
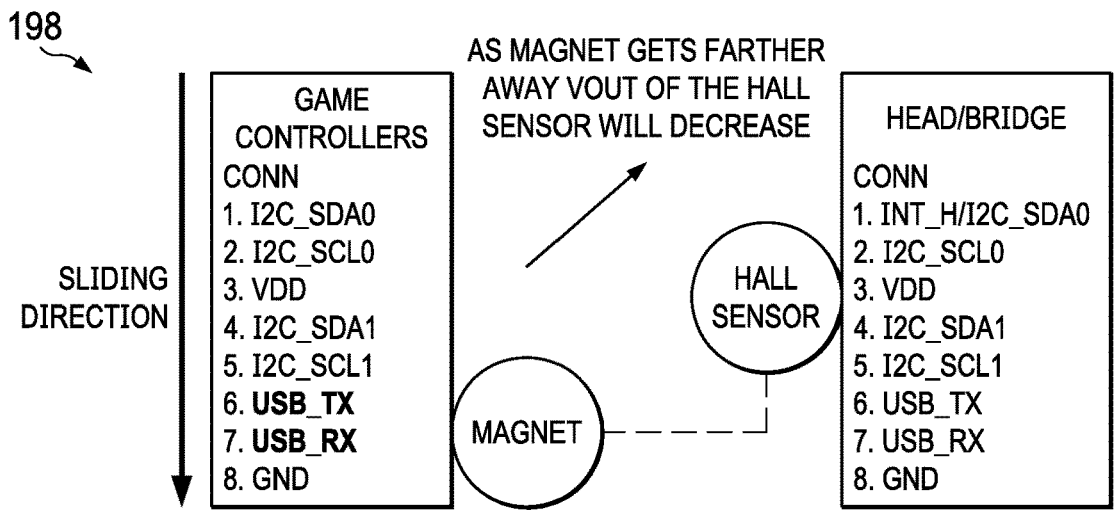

Referring now to FIGS. 11A, 11B and 11C, a flow diagram depicts an example embodiment of identification by a bridge or information handling system of game controller type based upon wired interface contacts during a sliding attachment motion. Identification of pin count and configuration during a sliding attachment motion improves flexibility for integrating different types of functions within a game controller and supporting third party game controller implementations to create a rich ecosystem of compatible peripheral devices. For instance, various configurations of supporting hardware integrated in a game controller, such as peripheral speakers, a supplemental battery, a camera, a small display, etc. . . . , may include additional wire interface pin connections and/or a different order for the pins. Monitoring pin and pad interfaces of a wired connection through a sliding attachment motion supports detection of pin connection success across plural different game controller hardware and pin configurations, such as third party implementations that may vary the pin arrangement. In one example embodiment, detecting pin interfaces through sliding connection process allows elimination of some pins, such as identifier pins, since the game controller type is determined by the pin interfaces during the connection process. In one embodiment, the sliding connection pin interfaces may further supplement game controller operations by providing a power on command without a dedicated power on pin.

In the example embodiment depicted by FIG. 11, a magnet and Hall sensor are disposed in fixed positions at opposing sides of the attachment structure, such as with the Hall sensor interfaced with an MCU disposed in a bridge or information handling system. At step 194, the first part of a game controller 12 attachment to a bridge 20 is started with alignment of a ground pogo pin 8 with an identifier pin 1 of the bridge. For instance, at initiation of attachment, the attachment structure misaligns both sides of the wired interface so that no pins connect with the sliding attachment motion first bringing the game controller 12 number 1 pin into contact with the bridge 20 number 8 pin. In one alternative embodiment, the number 1 pin is a dedicated identifier pin that provides identification of the game controller device. In an alternative embodiment, the number 1 pin may be repurposed after attachment to provide support for I2C communication, thus reducing the total pin count. At step 194, a voltage out from the Hall sensor is provided to an analog pin of the bridge MCU so that the variable voltage out provides an indication of the presence of the magnet and its relative distance to the Hall sensor. At step 196, the attachment structures slide from the misaligned position towards an alignment position with the relative voltage output by the Hall sensor reaching a high value half way through the sliding motion has the magnet and Hall sensor align with game controller 12 ground pin number 8 contacting the bridge number 4 pin. At step 198 as the sliding attachment motion completes, the voltage out from the Hall sensor decreases with the magnet moving farther away from the Hall sensor until the number 8 ground pins align at opposing sides of the wired interfaces. During the sliding attachment, each pin of the bridge 20 wired interfaces briefly touches ground to provide an additional indication of the alignment of both sides of the wired interface through the attachment process as described in greater detail below. In particular, the example embodiment illustrates that pins 4 through 7 of game controller 12 may be initially configured as empty and then used to supplement I2C and USB communication once the type of game controller and its features are identified.

Figure 12:
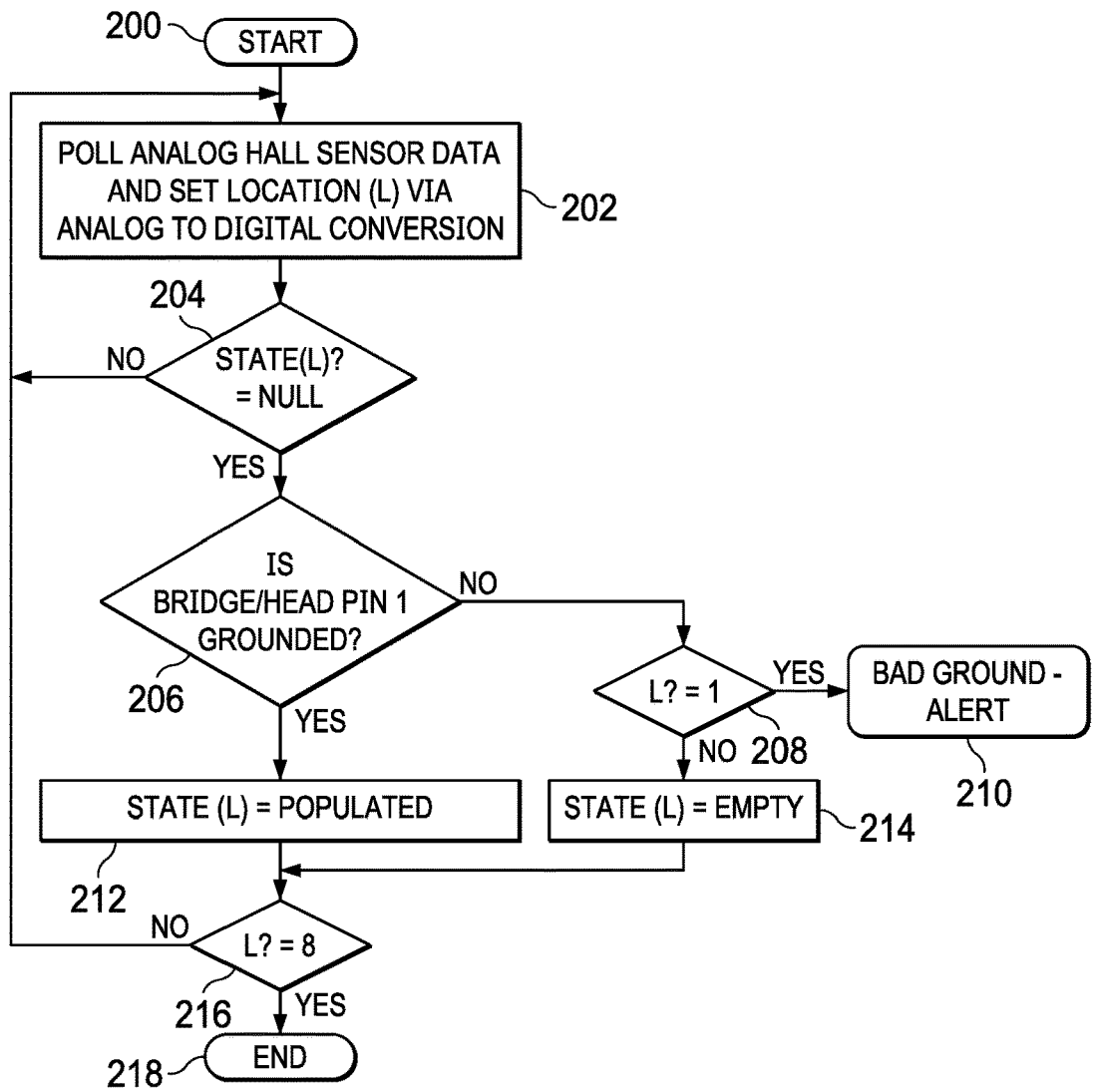
FIG. 12 depicts a flow diagram of a process for detecting game controller active pin count during a sliding attachment motion.

Referring now to FIG. 12, a flow diagram depicts a process for detecting game controller active pin count during a sliding attachment motion. The process starts at step 200 with alignment of the attachment structures to an initial position with the wired interfaces misaligned. At step 202, the bridge processor polls analog voltage output by the Hall sensor to estimate the relative location of the wired interfaces based upon an analog conversion of the detected voltage and sets the value L as the pin value. The wired interface relative alignment may be estimated based upon expected voltage levels, such as with a calibration performed after each completed attachment where the magnet ends at the same distance from the Hall sensor as it has on initial misalignment. Alternatively, relative alignment may be estimated as voltage levels change through the sliding attachment motion. At step 204, a determination is made of whether the location determined by the Hall sensor has a value and, if not, the process returns to step 202 to continue polling for detection of a pin at the location indicated by the Hall sensor. Once the Hall sensor locates a pin with the output voltage at step 204, the process continues to step 206 to determine whether the bridge pin number 1 is grounded. If the bridge pin number 1 is not grounded, the process continues to step 208 to determine if the location is the number 1 bridge pin. If the location is the number 1 bridge pin, a ground is expected so that a failure to detect ground continues to step 210 to end the process with an indication of a bad ground. If at step 208, the location is not the number one pin, the process continues to step 214 to indicate that the pin location is empty. If at step 206 the bridge number 1 pin is grounded, the process continues to step 212 to store the pin location L as populated. From steps 212 and 214, the process continues to step 216 to determine if the position L has reached the eighth and last pin. If not, the process returns to step 202 to continue with the detection of the next pin location. Once the final pin location is reached, the process ends at step 218.

Referring now to FIG. 13, an alternative embodiment of game controller 12 pin arrangements is depicted having an identifier pin used as an indication of the number of used and empty wired interface pins. In the example embodiment, pins 6, 7 and 8 of the bridge 20 connector 66 supports an identification pin at each location with communication between connector 66 and MCU 162 managed through first and second multiplexors 220. In the example embodiment, if pin 6 is an identification pin, MUX 1 220 routes pin 6 to ID_H1; if pin 7 is an identification pin, MUX 2 220 routes pin 7 to ID_H2; and if pin 8 is an identification pin, it proceeds directly to ID_H3 at MCU 162. Pins 6 and 7 alternatively configure through multiplexors 220 as a second I2C communication link, although other types of alternative interfaces may be used. Logic in MCU 162 selects multiplexor 220 routing based upon the location of the identification pin. For instance, at initial attachment MCU 162 polls each of pins 6, 7 and 8 to determine which is the identification pin and selects the multiplexors accordingly.

Figure 14A:
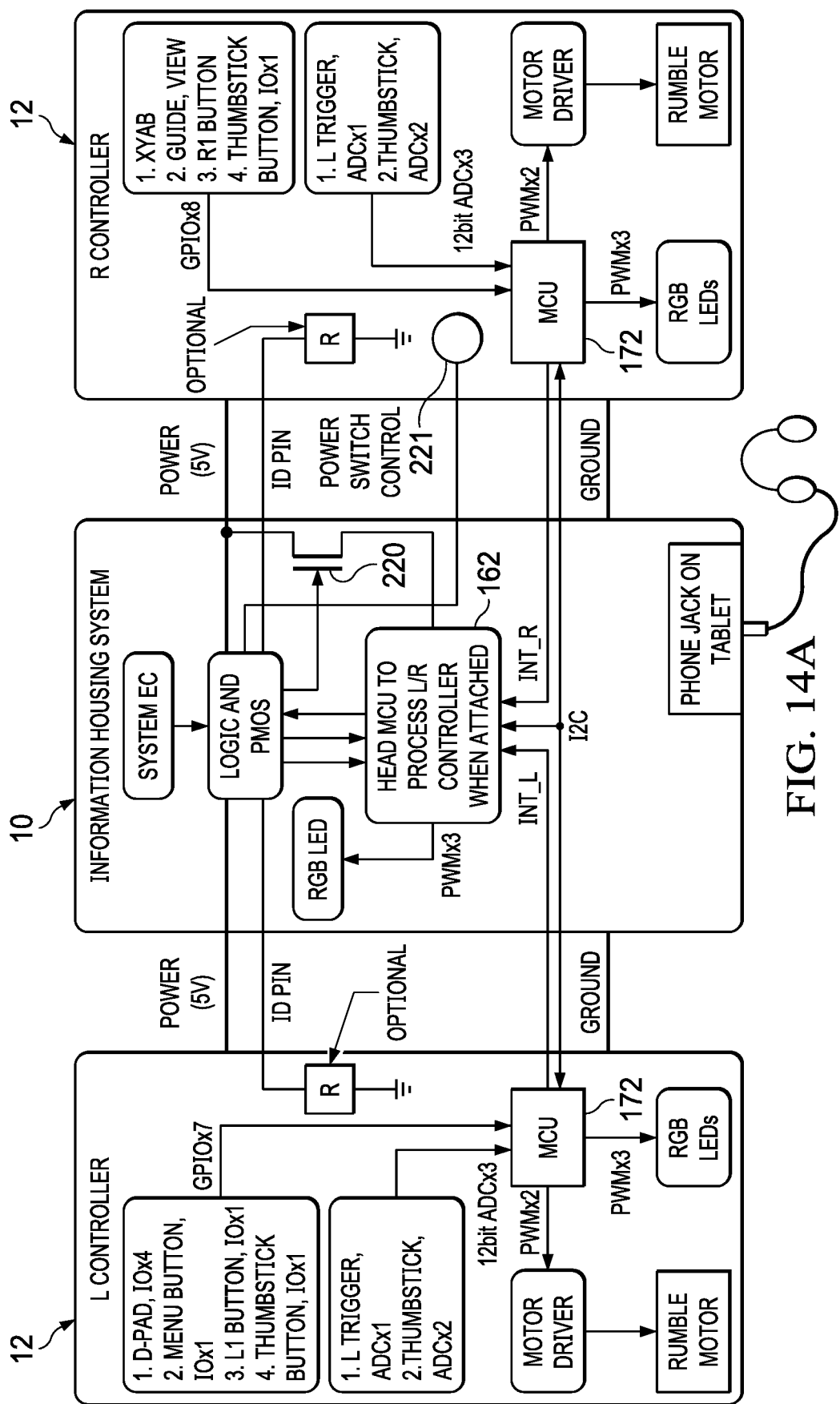

Referring now to FIGS. 14A and 14B, a circuit block diagram depicts a seven pin count wired interface between an information handling system 10 and first and second game controllers 12 coupled at opposing sides. In the example embodiment, pin 7 is dedicated to a physical power switch control 221 that aligns to a guide button functionality so that during attachment of controller 12 to information handling system the guide presses power switch control 221 to power up game controller 12. During attachment, interfacing the guide against power switch control 221 acts as a dedicated power button with a press to complete power up and down sequencing between game controller 12 and information handling system 10. For example, 5V of power is provided through pin 1 to each game controller 12. The identification pin 6 for both the left and right game controllers 12 is grounded to only provide an attachment indication when attachment is complete so that power is communicated from switch 220.

Figure 15A:
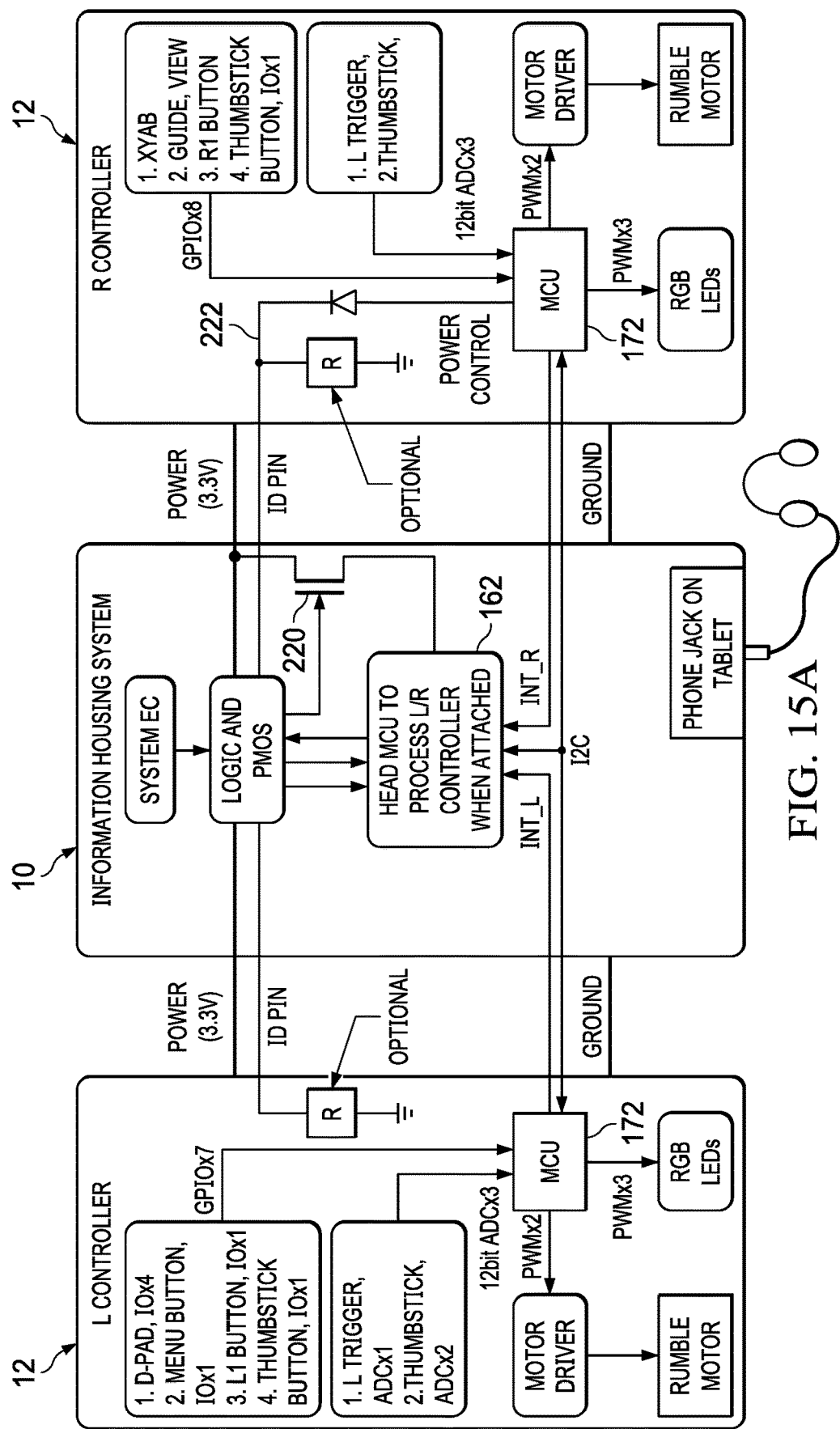

Referring now to FIGS. 15A and 15B, a circuit block diagram depicts a six pin count wired interface between an information handling system 10 and first and second game controllers 12 having an identification pin repurposed to control power. In the example embodiment, a power control 222, such as a diode, is disposed between MCU 172 and the identification pin assigned to pin 6 so that MCU 172 commands power up and down based upon the high or low value of identification pin 6. When the identification pin is pulled low at connection to information handling system 10, logic on MCU 172 and information handling system 10 coordinate to apply power to game controllers 12 at pin 1 with 3.3V and the game controllers enter power up. Using the identification pin as a dual purpose for both detecting attachment and commanding power up and down eliminates the need for dedicated pin 7 and the power switch of the embodiment of FIGS. 14A and 14B. Although the example embodiments of FIGS. 14A, 14B, 15A and 15B address attachment of game controller 12 to information handling system 10, a substantially identical circuit may be used with attachment of game controller 12 and bridge 20. Generally, information handling system and bridge attachments operate interchangeability to attach to game controllers 12.

Figure 16:
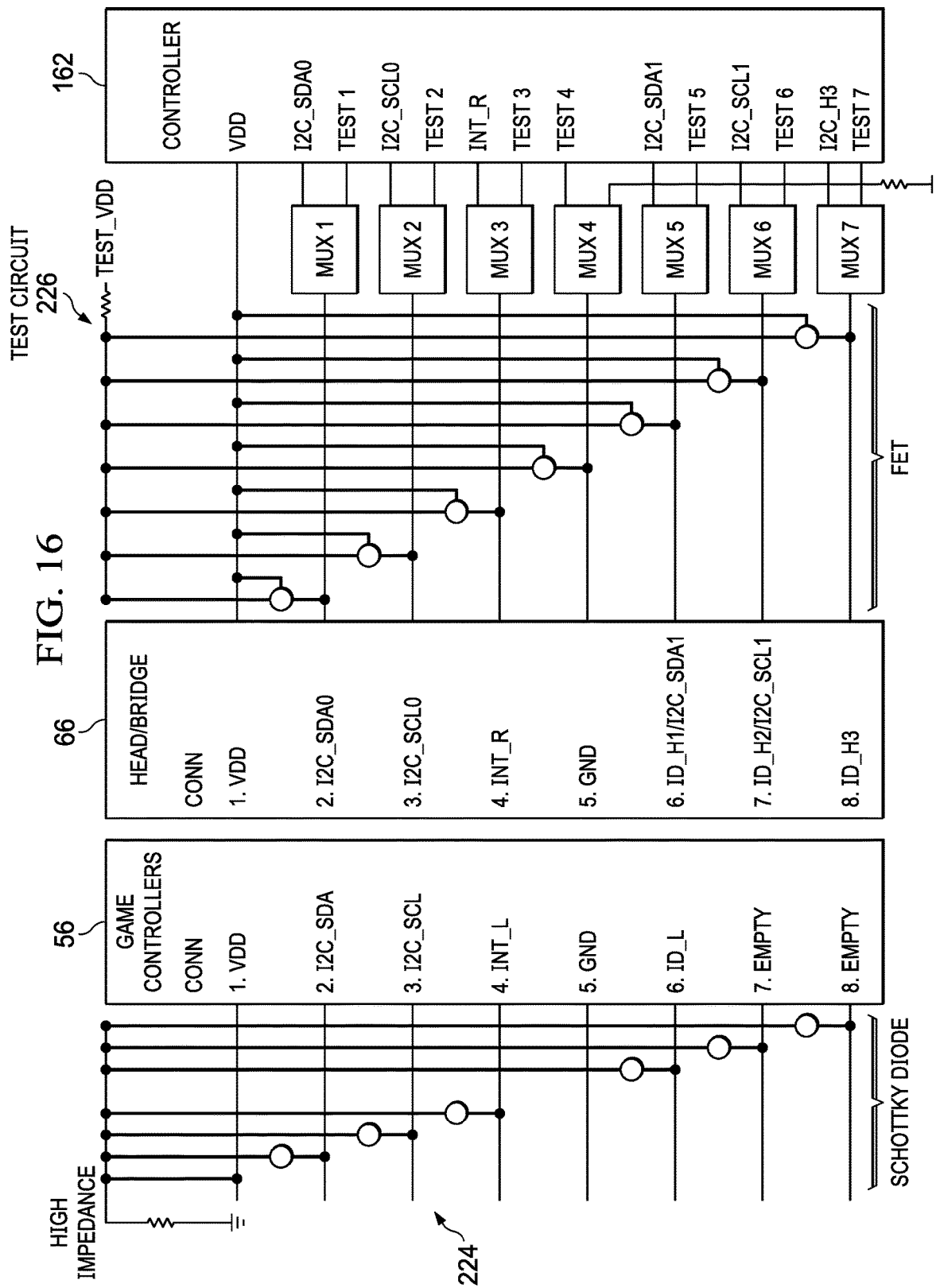
FIG. 16 depicts a circuit block diagram of an example embodiment having opposing pins pulled high and to ground to confirm attachment connections before game controller power up.

Referring now to FIG. 16, a circuit block diagram depicts an example embodiment having opposing pins pulled high and to ground to confirm attachment connections before game controller power up. In the example embodiment, game controller 12 has all pins at connector 56 pulled low and information handling system 10 has all pins at connector 66 pulled high. Electrical communication between connectors 56 and 66 is confirmed once all pins are shorted to ground. Once electrical connections are verified by short to ground, a power up sequence is initiated and applying power at game controller 12 breaks the ground connection there. To support connection testing, test circuit 226 provides a multiplexor 220 between connector 66 and MCU 162 at each pin to interface each connector pin 66 with both its logical pin at MCU 162 and a test pin at MCU 162. At the game controller side, a high impedance circuit 224 interfaces with each pin of connector 56 to provide ground to each pin. The test VDD is applied by logic at MCU 162 so that the test pins can be read to determine ground. Once each test pin detects ground, a good connection of connectors 56 and 66 is determined and power up of the game controller breaks the ground connection at high impedance circuit 224. In example embodiment, Schottky diodes are disposed in high impedance circuit 224 and p-channel FETs are disposed in test circuit 228.

Figure 17:
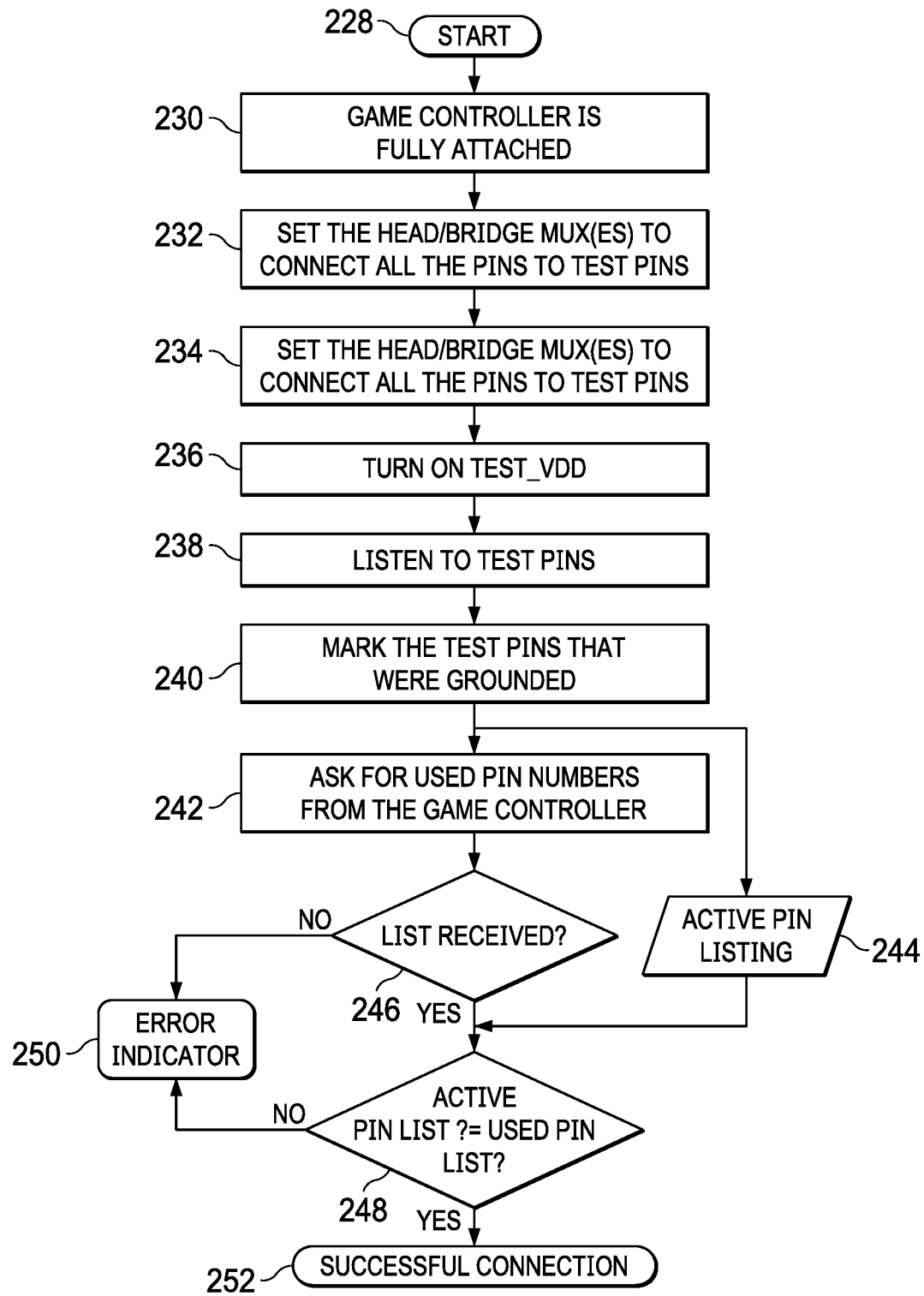
FIG. 17 depicts a flow diagram of a process for confirming game controller attachment with the example embodiment of FIG. 16.

Referring now to FIG. 17, a flow diagram depicts a process for confirming game controller attachment with the example embodiment of FIG. 16. The process starts at step 228 and at step 230 the game controller "wing" is connected to the information handling system or bridge. At step 232, test circuit 226 sets the multiplexors 220 to route to the test pins of MCU 162. At step 234, the game controller high impedance test circuit 224 defaults to interface ground to the connector 56. At step 236, logic of MCU 162 turns on power to the test VDD to bring all of the pins of connector 66 to a high state. At step 238, MCU 162 listens to each of the test pins to detect a high or low state. At step 240, MCU 162 stores a list of the high or low states at each pin of connector 66 at step 244. Once the test is completed, the VDD is powered on, which breaks the connection of the pin with the test VDD, the test VDD is powered down and MCU 162 queries the game controller to retrieve a list of the pins used by the game controller. At step 246, a determination is made of whether the list is received and, if not, the process continues to step 250 to indicate an error. If the list is received, the process continues to step 248 to compare the list of active pins with the list of pins provided from the game controller. If a pin from the game controller list is not active, an error is indicated at step 250. If all of the pins indicated as used by the game controller are active, the process ends at step 252 with an indication of a successful connection.

Figure 18:
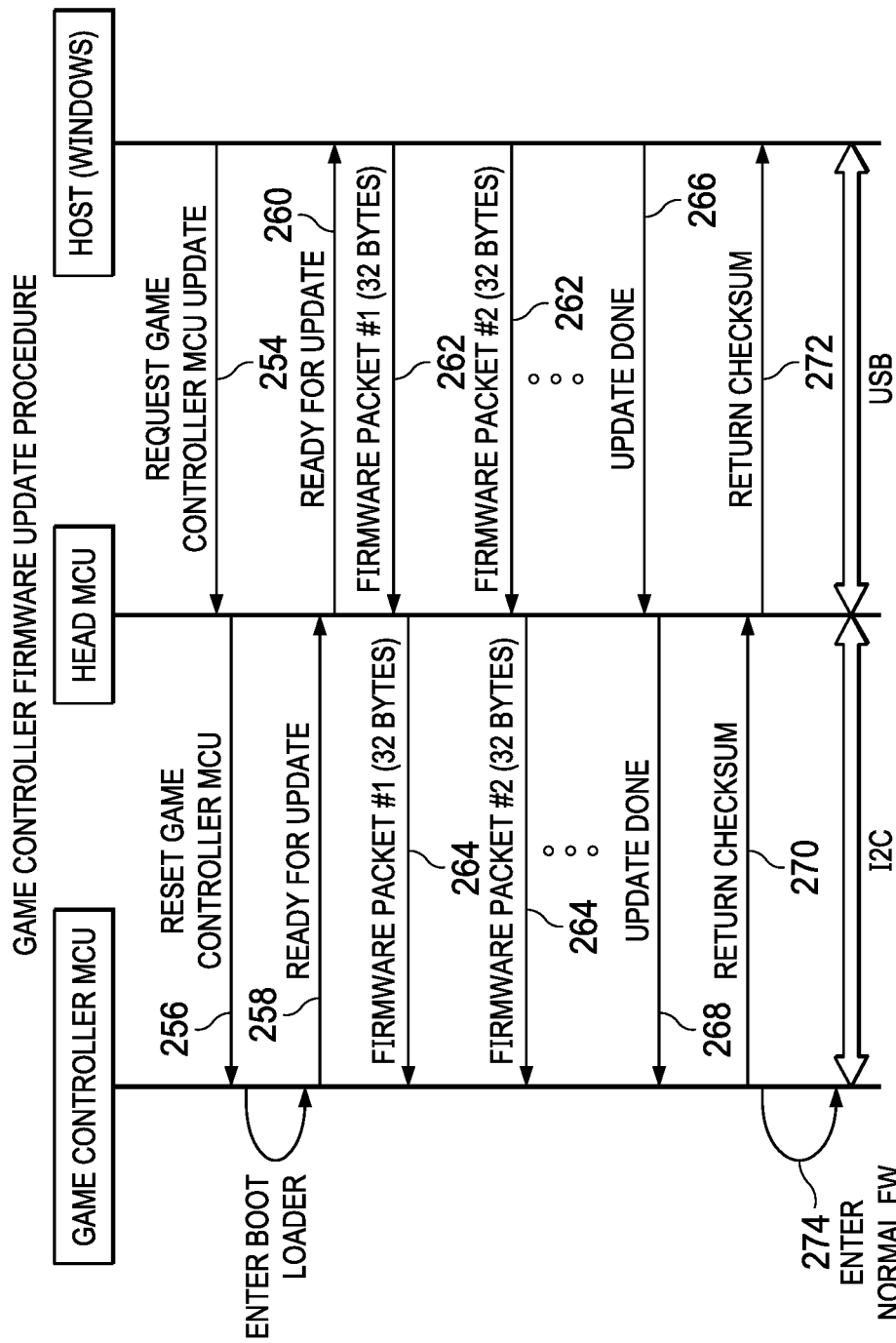
FIG. 18 depicts a flow diagram of a process for updating firmware at game controllers, bridges, and information handling systems.

Referring now to FIG. 18 a flow diagram depicts a process for updating firmware at game controllers 12, bridges 20 and information handling systems 10. Although interchangeability of game controllers with different capabilities as attached to different bridges and information handling systems provides improved flexibility for end users, changing configurations may result in different embedded code versions operating on the MCU within each game controller, bridge and information handling system. In order to ensure consistent communications and interactions, each MCU stores locally a firmware version and communicates the firmware version upon attachment. For example, embedded code firmware is stored in non-transient memory of the MCU or interfaced with the MCU, such as programmable static random access memory (SRAM) or other flash memory devices. If one device in an attached configuration has a more recent firmware version than another device, the firmware update process depicted by FIG. 18 is initiated to update the embedded code. In one example embodiment, each MCU in the game controller, bridge and information handling system executes a common version of embedded code that supports individual device functions based upon identification of the device type. With the same embedded code distributed to game controller, bridge and information handling system MCUs, the MCU with the most updated embedded code copies its firmware to the other devices. In one example embodiment, a game controller with a most updated embedded code version copies the embedded code to an information handling system, which in turn copies the update to a second game controller attached at an opposing side of the information handling system. A similar process may take place where a bridge receives a firmware update from a first game controller and provides the update to a game controller at an opposing side of the bridge.

A most likely firmware update scenario involves the information handling system getting firmware updates through a network interface and communicating the firmware updates directly to attached game controllers, directly to a bridge through a wireless or USB interface, or indirectly to game controllers that are attached to a bridge. If the information handling system, bridge and game controller MCUs run different code, a copy of each device type firmware may be stored on each device to support updates between devices. In some instances, older versions of firmware may be stored at a device to execute in a situation where an attached device cannot perform an update. Security measures to ensure that malicious code is not loaded may include a verification or security code associated with an update, such as based upon a hash of the update.

In the example embodiment, an embedded code update is initiated from a host information handling system device to a "wing" game controller device. In alternative embodiments, as described above, firmware updates may be initiated from any device that has a most recent embedded code version. The process starts at step 254 with a request by the host operating system, such as WINDOWS, to initiate a game controller MCU embedded code update. The "head" information handling system communicates the requested update at step 256 as a reset command to place the game controller MCU in a bootloader mode. At step 258, after entering the bootloader mode the game controller responds with a message indicating that it is prepared to accept the update. The information handling system MCU at step 260 forwards the bootloader initiated message to the host operating system. At step 262 the host operating system sends 32 Byte firmware update packets to the information handling system MCU, which, at step 264, forwards the firmware update packets to the game controller MCU. Steps 262 and 264 repeat until the firmware update transfer to the game controller is complete. At step 266, the host operating system sends an update done message to the information handling system, which, at step 268 forwards the update done message to the game controller MCU. At step 270, the game controller MCU computes a checksum of the firmware update and sends the checksum to the information handling system MCU, and at step 272 the information handling system MCU sends the checksum to the host. The game controller MCU executes the firmware update and enters normal operational mode to communicate with the information handling system MCU through an I2C link, which provides communication to the host through a USB link.

Figure 19:
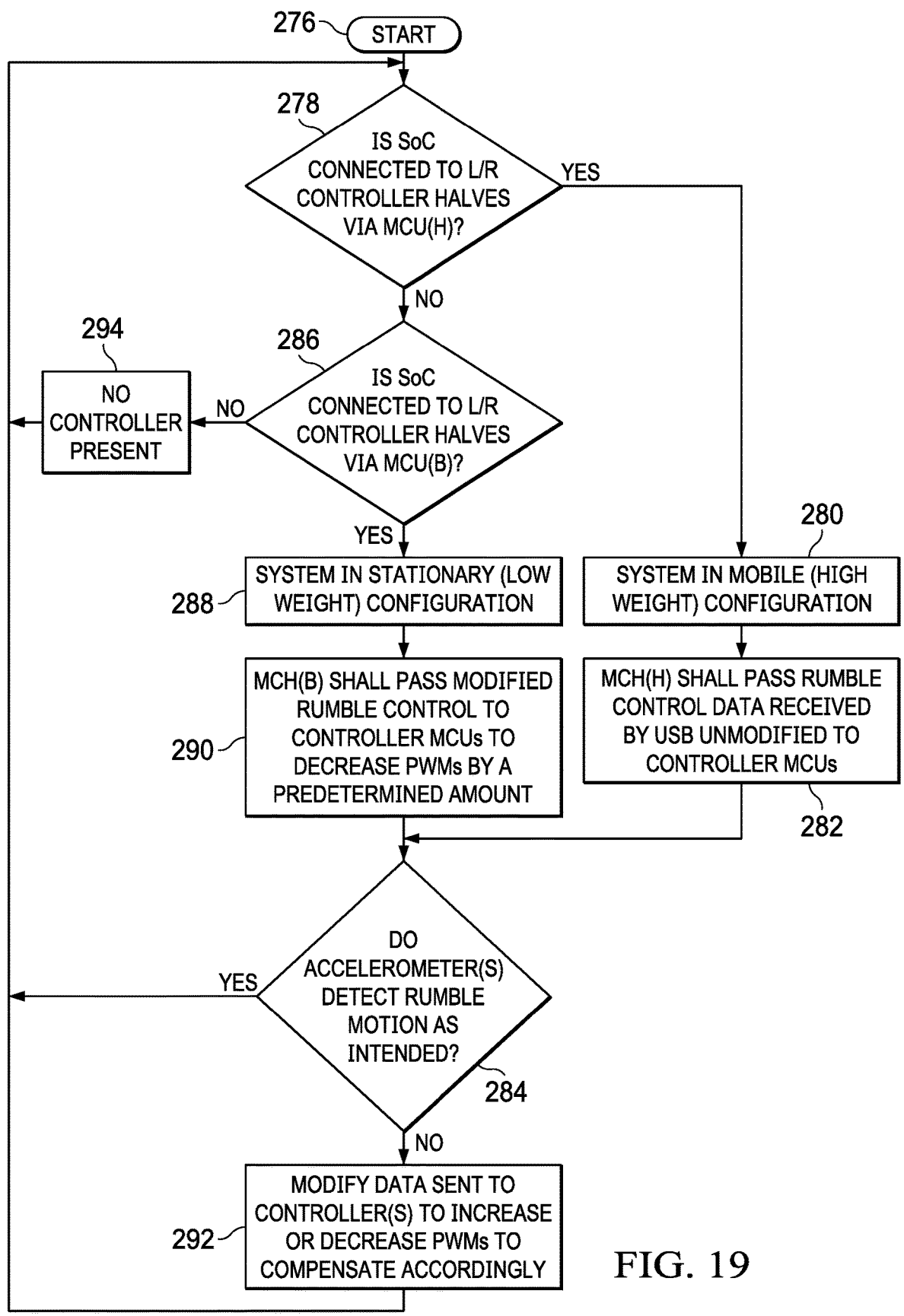
FIG. 19 depicts a flow diagram of a method for adapting haptic response at a game controller based upon the type of operational configuration of the game controller.

Referring now to FIG. 19, a flow diagram depicts a method for adapting haptic response at a game controller based upon the type of operational configuration of the game controller. As described above, each game controller 12 integrates one or more haptic devices that provides a haptic feedback to an end user, such as eccentric rotating mass motor (ERM) that generates vibration by rotating a weight off center from a rotational axis or a linear resonant actuator (LRA) that generates vibration using magnetic fields and electrical fields. In one example embodiment, a first haptic device generates vibration in a first plane and a second haptic device generates vibration in a second plane, such as perpendicular to the first plane. As described above, each game controller may attach to both an information handling system housing or a bridge housing. Since the information handling system has a greater mass than the bridge, a given haptic response will vary depending upon the weight of the device as a whole so that a haptic response at an information handling system will have less vibration than the same response at a bridge. In an embodiment where different hardware configurations exist for game controllers, bridges and information handling systems, the mass of each attached device will have an impact on haptic device feedback felt by an end user. To adjust for different system total mass with different configurations, haptic feedback is adjusted based upon total mass and refined based upon accelerations sensed at the information handling system. For example, an accelerometer detects actual haptic response for the game controller MCU to compare against intended haptic response so that the haptic device operation can be adjusted, such as by changing the pulse width modulation applied to an ERM that generates vibration. One advantage to compensating haptic response based upon detected accelerations is that other factors are also taken into account, such as the tightness of an end user grip on the game controller, the mass of an end user's hands and situations where haptic response is unhelpful, such as when the game controller is resting on a table resulting in excessive vibration. In addition, orientation of the game controller sensed by the accelerometers can adjust haptic response from different haptic devices integrated out of plane from each other, including a direction of the rotation of an ERM between clockwise and counterclockwise.

The process starts at step 276 and continues to step 278 to determine if the game controllers are attached to an information handling system, such as by retrieving device type information from the information handling system MCU. If the game controllers are attached to an information handling system, the process continues to step 280 to place the game controller haptic device in a high weight configuration. For instance, a full haptic response is generated and communicated to the haptic device to ensure that adequate vibration is felt by the end user. At step 282, the information handling system MCU passes rumble control commands to generate the haptic response with the full ERM motor speed to the game controller MCU. The process then continues to step 284 to determine if accelerometers at the game controller and/or the information handling system detect vibration expected for the commanded haptic response. If yes, the process returns to step 278 to continue monitoring haptic response. If the haptic response differs from the expected response at step 284, the process continues to step 292 to modify the commanded haptic response to compensate for the response detected by the accelerations. For instance, if the haptic response detected by accelerometers exceeded the expected haptic response, a lower ERM rotation speed is commanded; and if the haptic response detected by accelerometers does not meet the expected haptic response, a higher ERM rotation speed is commanded. Similar adjustments are applied in an LRA haptic device is used instead of an ERM haptic device.

If at step 278 the game controllers are not attached to an information handling system, the process continues to step 286 to determine if the game controllers attach to a bridge, such as by exchanging a device type identifier with the bridge MCU. If the game controllers are connected to a bridge device, the process continues to step 288 to configure the haptic response at a low weight configuration, such as having a reduced haptic response in proportion to the weight of the game controllers attached to the bridge instead of the information handling system. At step 290, the haptic response commanded to the haptic device is reduced based upon the reduced weight. The process then continues to step 284 to compensate for any differences between detected accelerations and expected accelerations of the haptic response. If at step 286 neither the bridge nor information handling system is attached, the process determines no controller and returns to step 278. At step 290, the modification of the haptic response for the reduced weight configuration, such as the lower ERM rotation speed, may be determined at the information handling system and sent to the bridge or the bridge may alter the full haptic response received from the information handling and provided to the game controller. In one embodiment, logic in the game controller MCU reduces the full haptic response commanded by the information handling system or bridge to compensate at the game controller for the reduced weight. As described above, the adjustments determined by monitoring sensed accelerations can include adjustments to vertical versus horizontal LRA axial vibration or ERM rotation and adjustments to the rotational direction of different ERM.

Figure 20:
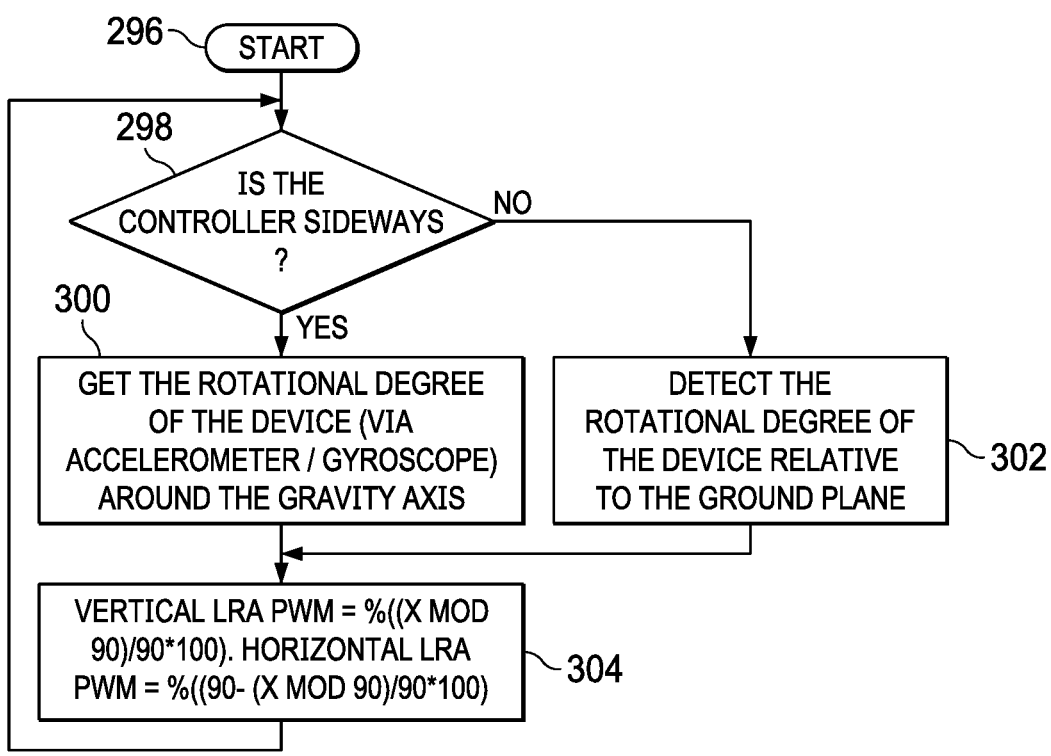
FIG. 20 depicts a flow diagram of a process of adjusting haptic response based upon an orientation of a game controller.

Referring now to FIG. 20, a flow diagram depicts a process of adjusting haptic response based upon an orientation of a game controller. In various embodiments, the haptic response may be generated with an ERM, LRA or other types of vibration-generating devices. For instance, LRA haptic devices tend to provide better control of the vibration axis compared with ERM haptic devices so that a game controller with horizontal and vertical vibration control may be implemented with two LRA devices oriented perpendicular to each other. The process starts at step 296 and, at step 298 a determination is made of whether the game controller has a sideways orientation. Generally, while playing a game the game controller is expected to be within the 90 degrees of rotation distance from the user plane. That is, the end user's expected orientation provides a plane of expected orientation of the game controller that identifies how much relative rotation should apply to first and second vibration response, such as LRA axial vibration or eccentric rotating masses rotating about perpendicular axes. If the game controller is sideways, the process continues to step 300 to retrieve from gyroscopic logic of the accelerometer the degree of rotation about the axis of gravity. If the game controller is not sideways at step 298, the process continues to step 302 to detect the rotational degree of the game controller relative to the ground plane. These determinations of relative orientation provide an X value to input to the modulus equations of step 304 that define a vibration response of a vertically-orientated and horizontally oriented haptic device. The process then returns to step 296 to continue monitoring game controller orientation and adjusting vertical and horizontal vibration response. In one example embodiment, haptic response is programmable by an end user interface so that the end user can adapt haptic response as desired for a specific controller or gaming application, such as changes to the intensity of haptic response and changes to directional impulses.

Figure 21:
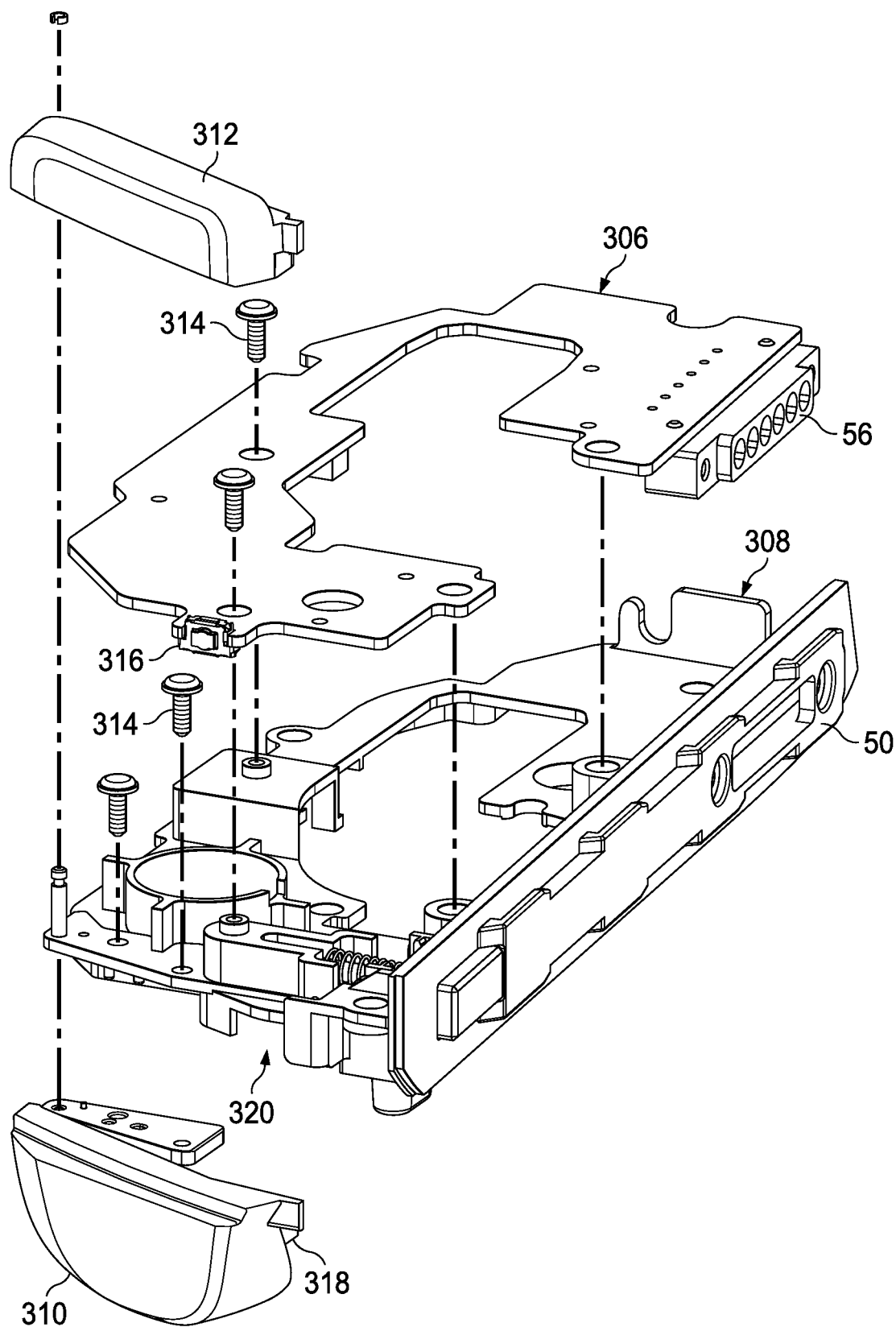
FIG. 21 depicts an exploded view of a game controller having a vertical axis trigger assembly to accept end user trigger inputs.

Referring now to FIG. 21, an exploded view of a game controller 12 depicts a vertical axis trigger assembly to accept end user trigger inputs. Since game controller 12 couples both directly to an information handling system housing and to a bridge that supports peripheral operation, game controller 12 input devices adapt to both types of configurations with a vertically aligned trigger motion. In particular, when game controllers 12 attach at opposing ends of an information handling system housing, the end user grasp supports not just actuation of input devices but also hand held viewing of a display integrated in the information handling system tablet form factor. A vertically aligned trigger motion aids end user grasp at the periphery of the information handling system housing while disposing actuation structure in plane with the tablet planar housing form factor, thus minimizing the impact of the input devices on system portability when game controllers 12 are attached. A difficulty with this arrangement is that index and middle fingers that typically interact with a trigger can exert a substantial force on a trigger input device. To withstand this force and provide a robust input device with repeatable and nonbinding inputs, a trigger subassembly with vertically aligned input rotation provides ideal trigger tactile feedback and response time for trigger inputs in a comfortable end user grasp.

In the example embodiment, a trigger 310 couples as a subassembly to a midframe assembly 308 to provide robust trigger inputs independent of a cosmetic outer housing. Coupling the trigger 310 as a subassembly provides isolation and independent actuation for trigger movement and reduces complications associated with manufacture and assembly of the game controller. Trigger 310 pivots about a vertical rotational axis relative to the plane of a grasped information handling system housing that aligns with an input fingers natural motion. In the example embodiment, a midframe 308 provides the main structural integrity of the game controller with attachment structure 50 defined at a side surface to attach to an information handling system housing. For instance, attachment structure 50 at the side surface of midframe 308 defines slots with an enhanced material thickness for a robust information handling system attachment in combination with lips that overlap the side surface when a cosmetic housing couples over midframe 308. An opening in the side surface of attachment structure 50 provides space for a wired connector, such as pogo pins 56, disposed at a printed circuit board 306 to insert through and interface with an information handling system wired interface. Printed circuit board 306 couples to an upper surface of midframe 308 with screws 314 to provide communication between the input devices, MCU and pogo pin connector 56. A trigger input button 316 located at one end of printed circuit board 306 to detect inputs at trigger 310. In the example embodiment, a secondary button 312 is provided above trigger 310 to accept press inputs detected by an upper portion of trigger input button 316. Input button 314 provides a press input device separate from trigger 310, although in alternative embodiments input button 314 may have a vertically aligned rotation similar to trigger 310 to provide a double trigger input device.

In the example embodiment, trigger 310 couples to midframe 308 to rotate about a vertical axis defined by a dowel pin axle 334 extending up from midframe 308 and coupling to a bracket in trigger 310 subassembly, as described in greater detail below. In addition, trigger 310 motion is defined by a member 318 that fits in a guide 320 integrated in midframe 308. Rotation about axle 334 provides a rotation axis at an outer perimeter of midframe 308 relative to the position of attachment structure 50 so that a finger extending from an end user grasp at the outer perimeter activates trigger 310 about a natural rotation axis. For instance, an end user grasp around the perimeter of an information handling system having a game controller attached places trigger 310 in position for a finger to activate at a front outer edge of the complete assembly.

Figure 22:
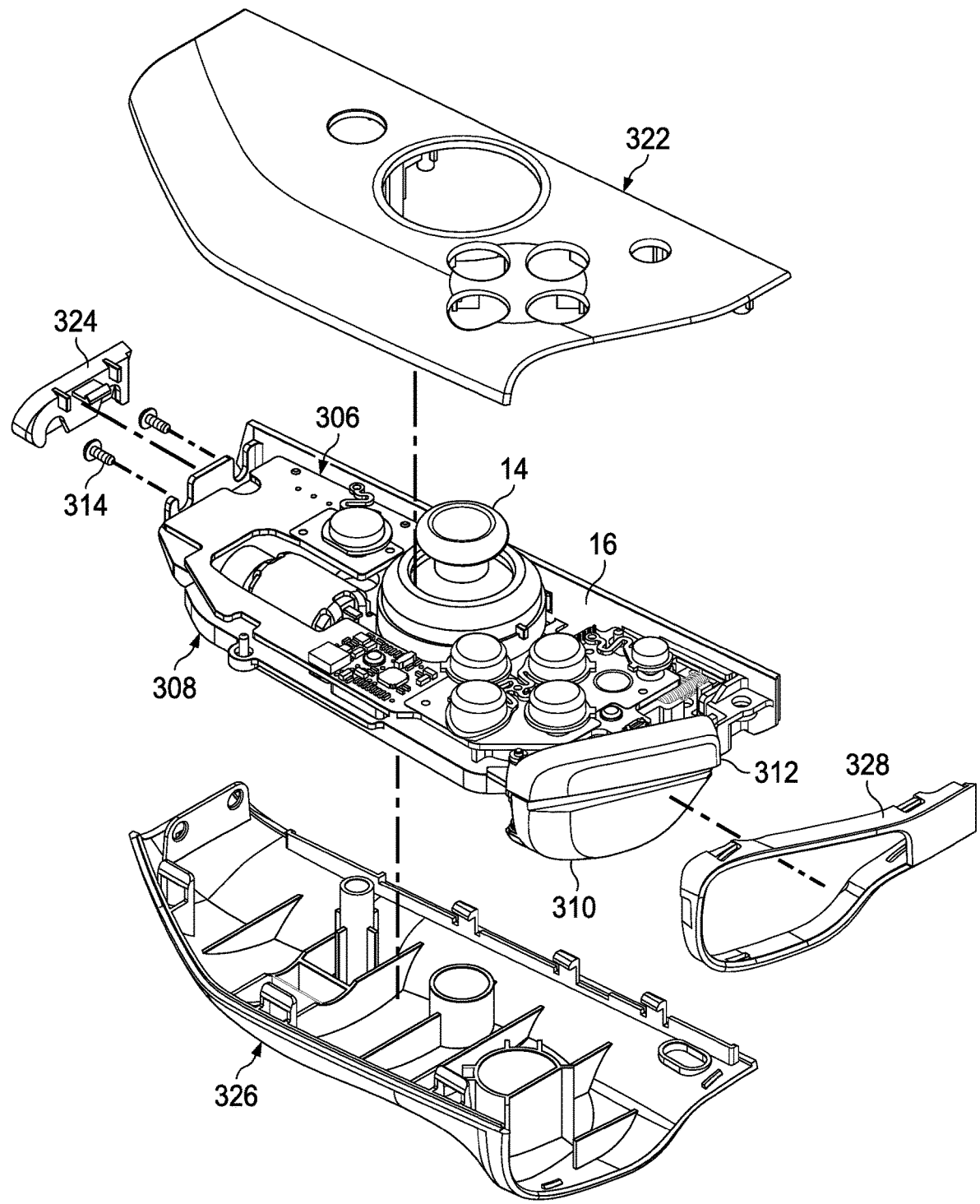
FIG. 22 depicts an exploded view of game controller covers aligned to assemble to a frame.

Referring now to FIG. 22, an exploded view depicts game controller covers 322 and 326 aligned to assemble to midframe 308. In the example embodiment, midframe 308 has a completed assembly with joystick 14 coupled to printed circuit board 306, buttons 16 coupled to printed circuit board 306, button 312 coupled to midframe 308 and trigger 310 coupled to midframe 308. Upper housing 322 encloses the upper surface of midframe 308 and lower housing 326 encloses the lower surface of midframe 308 with an end cap 324 securing upper housing 322 to lower housing 326 with screws 314. A bezel 328 couples to upper housing 322 and lower housing 326 to encircle trigger 310 and button 312. As is illustrated by the uncovered midframe, trigger 310 couples to midframe 308 independent of upper housing 322 and lower housing 326 so that operation of trigger 310 does not rely upon support of the decorative outer coating of game controller 12. The separated construction provides a more robust trigger 310 in the face of large end user input forces.

Figure 23:
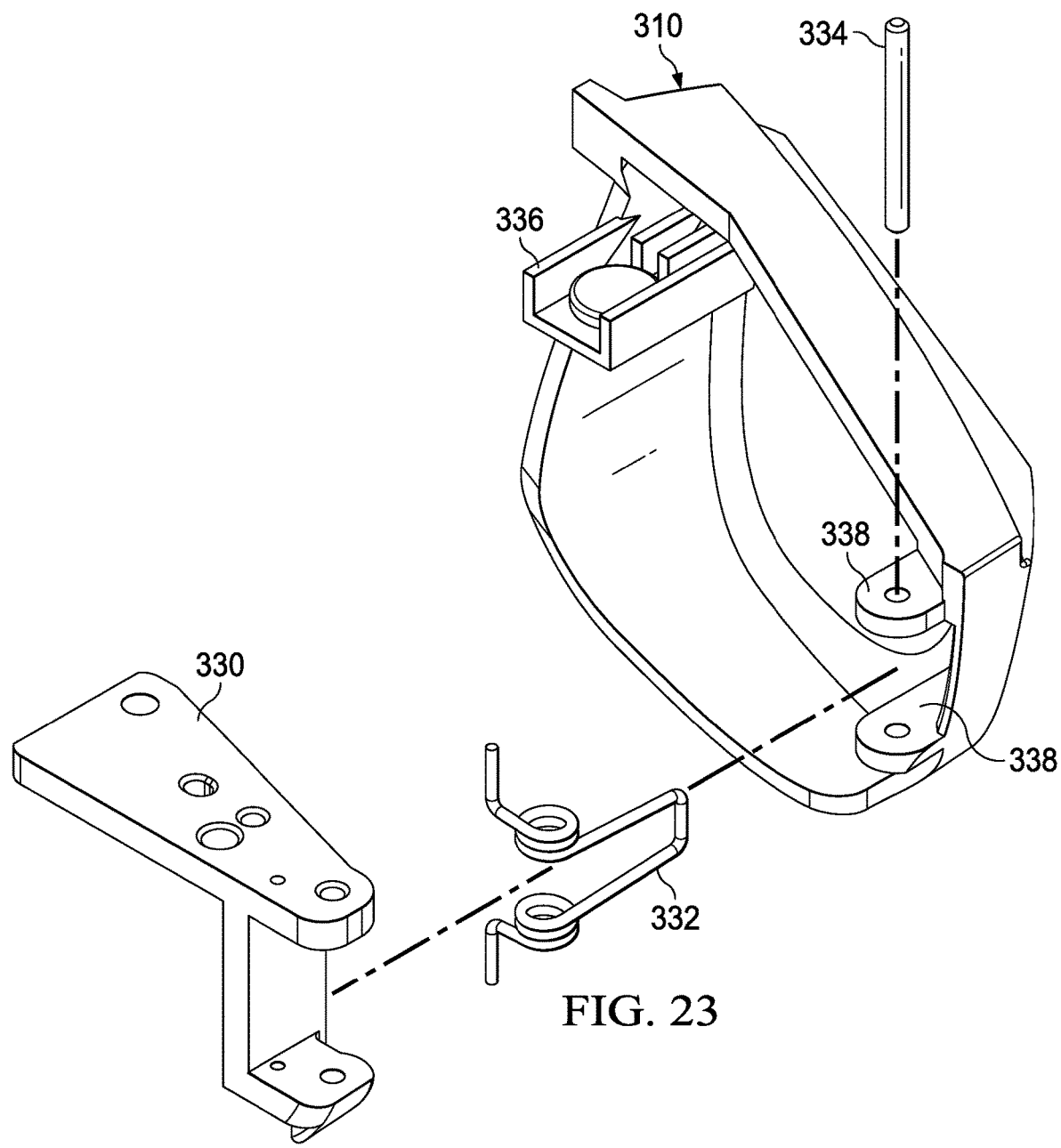
FIG. 23 depicts an exploded view of a trigger subassembly that couples to a game controller frame.

Referring now to FIG. 23, an exploded view depicts a trigger subassembly that couples to a game controller midframe. A trigger bracket 330 couples directly to midframe 308, such as with screws. Dowel pin axle 334 inserts through vertically aligned openings of trigger bracket 330 and through openings 338 formed at the rotational axis location of trigger 310. A torsion spring 332 fits over dowel pin axle 334 to create a biasing force that biases trigger 310 away from midframe 308. During manufacture, trigger bracket 330 is assembled to have trigger 310 coupled by dowel pin axle 334 with spring 332 engaged so that the subassembly is then coupled to midframe 308, thus reducing assembly time and complexity. Guide member 336 fits into a guide formed at midframe 308 to further simplify assembly and guide trigger 310 motion during trigger inputs.

Figure 24:
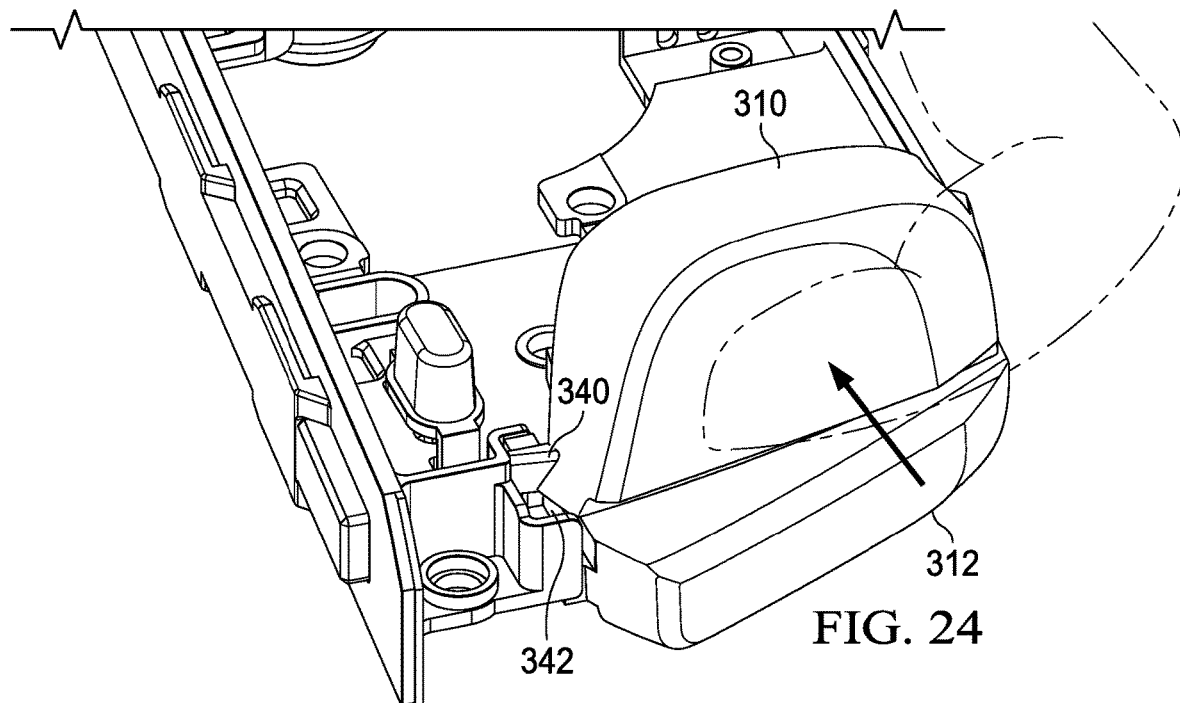
FIG. 24 depicts a lower perspective view of a trigger actuation at a midframe.
Figure 25:
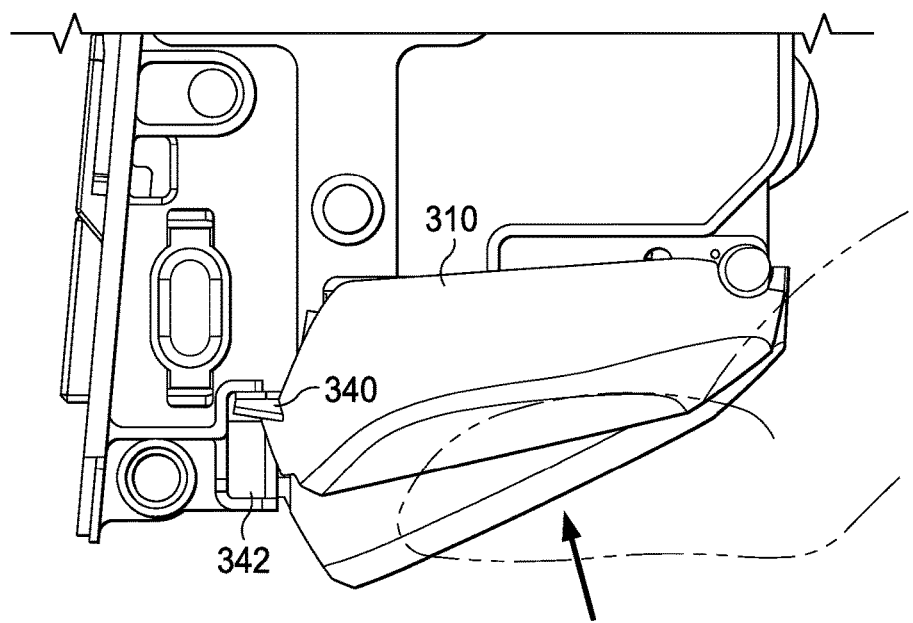
FIG. 25 depicts a lower view of the trigger actuation at the midframe.

Referring now to FIG. 24, a lower perspective view depicts trigger 310 actuation at a midframe 308. FIG. 25 depicts trigger 310 actuation from a bottom view. Trigger 310 rotates about a vertical axis towards midframe 308 without relying upon any outer cosmetic cover as support. An elastomeric end stop dampener integrates with midframe 308 at a stop point for trigger 310 rotation to absorb the force of an end user trigger input. A gap 342 formed in midframe 308 at the periphery of trigger motion aids in guiding trigger 310 towards dampener 340. Button 312 actuates separate from trigger 310 and also supported by midframe 308 without relying upon the outer housing.

Figure 26:
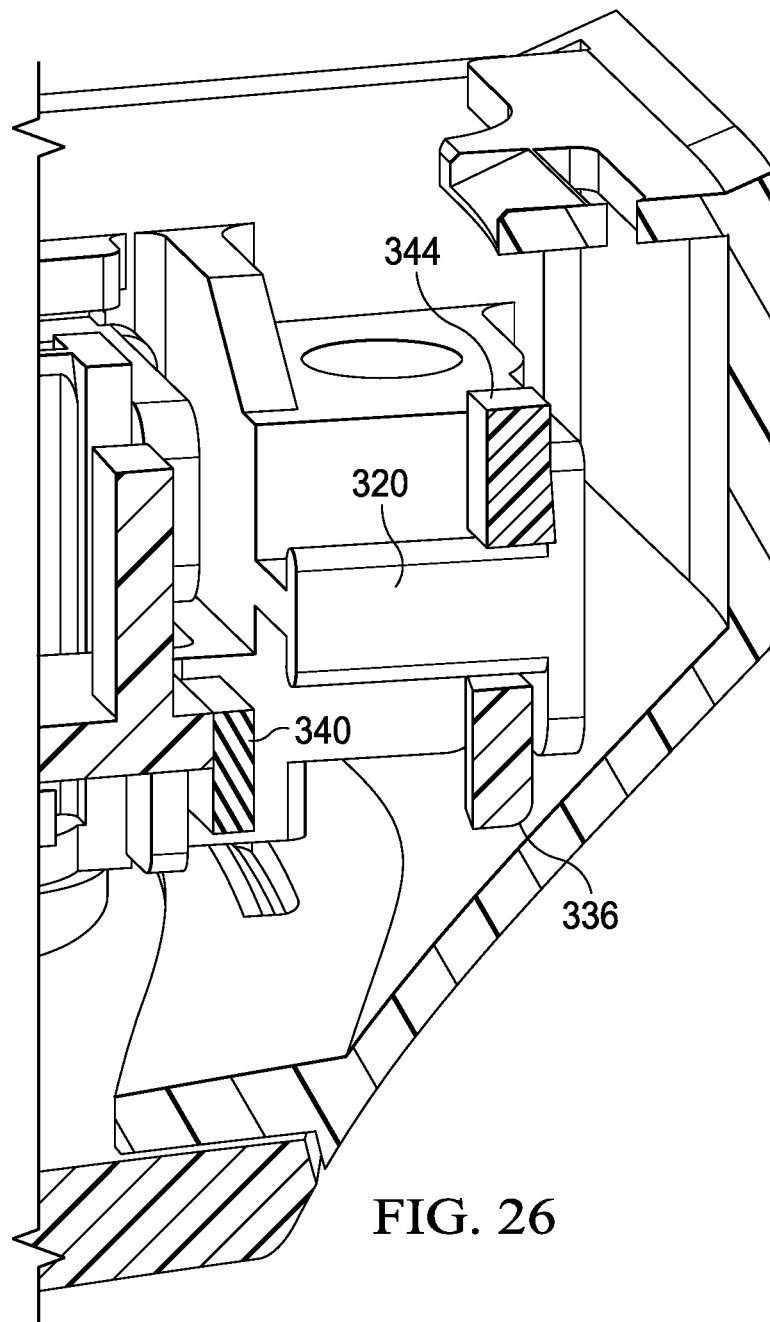
FIG. 26 depicts a lower front perspective view of a midframe to illustrate guide structures disposed to aid in trigger motion.

Referring now to FIG. 26, a lower front perspective view of midframe 308 illustrates guide structures disposed to aid in trigger motion. In the example embodiment, elastomeric dampener 340 integrates with midframe 308 structure to provide a firm stop for trigger motion with force partially absorbed at the stop by elastomeric material, such as an elastomeric plastic. A trigger guide tab 336 extends out from a midframe guide rail 320 to engage with the trigger and guide trigger motion. A button guide tab 344 extends out from midframe guide rail 320 to guide button motion at a press towards midframe 308.

Referring now to FIGS. 27A and 27B, a lower perspective exploded view depicts an illumination assembly that provides illumination at a joystick 14 extending from an upper surface of game controller 12. Illumination of different colors and intensities at game controller 12 provide indications to an end user about both the operational status of the game controller and gaming application status communicated from a gaming application executing on an information handling system, either through a direct wired interface or through indirect bridge communications. In the example embodiment, lighting effects are provided in a controlled and focused manner by directing illumination of a desired color and intensity at a circumference defined around the base of joystick 14. In some local operational instances, an MCU of game controller 12 locally determines the illumination for presentation. For instance, during a power up boot, a local game controller MCU might flash a first color and, after communication is configured for a coupled bridge or information handling system, the local MCU might flash another color as a success indication before handing control of illumination to the bridge or information handling system. Other types of locally determined illumination by the game controller MCU may include a failure to communicate with a bridge or information handling system, a mismatched firmware or hardware version. In some instances, illumination control is determined at bridge to present operational status as determined by the bridge, such as a lack by the bridge of a communication interface with an information handling system through USB, Bluetooth or IP communications. In addition, these operational status indications may be commanded from an information handling system to the illumination assembly where operational status issues are determined at the information handling system. In an operational mode, illumination color and intensity is supported by the operating system so that gaming applications can include indications that might include gaming events, such as loss of life, life status, alerts, etc. . . .

To direct illumination to a defined region at joystick 14, a plurality of red, green and blue (RGB) LEDs 356 are powered through a flexible printed circuit board strip that is mounted in a circular fashion around a translucent plastic light guide, such as may be formed with a double shot injection molding process. The top housing light guide 322 has a translucent region proximate joystick 14 and formed as an inner circumference at the opening through which joystick 14 extends. A non-translucent region 354 is defined around the outer circumference of the translucent region to form a boundary at which illumination is contained. A light guide 360 integrated in housing 322, such as with a double shot plastic injection of a translucent plastic, forms an enclosure that surrounds joystick 14 and defines a pathway through which illumination proceeds from the interior of game controller 12 to translucent region 352. An LED gasket 350 couples around the base of light guide 360 to have openings through which LEDs 356 of light ring flexible printed circuit 348 fit to transmit light into light guide 360. LED light gasket 350 seal illumination to proceed into light guide 360 without leaks into the game controller main body that might distract an end user. In one embodiment, non-translucent region 354 and region 358 is treated to prevent transmission of light, such as with a layer of paint or other covering. In another embodiment, light guide 360 is formed as a separate piece that assembles into game controller 12 with light gasket 350 and light right flexible printed circuit board coupled into place. Light ring flexible printed circuit board has a tail that couples to the game controller main printed circuit board to accept commands from the game controller MCU that defines illumination color and intensity.

Figure 28:
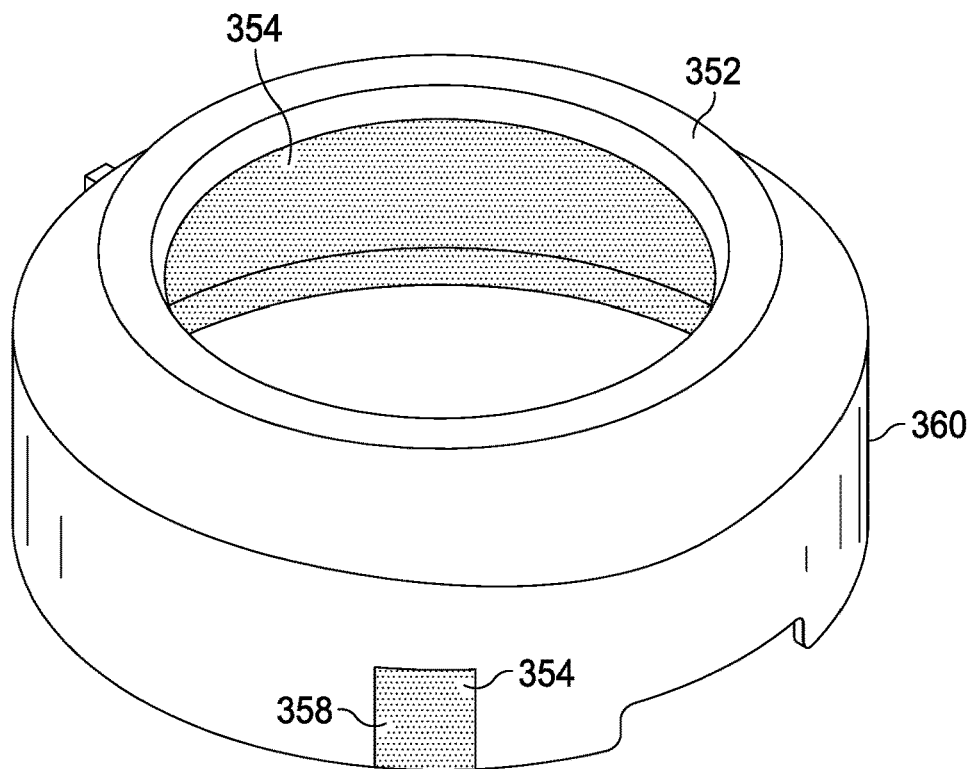
FIG. 28 depicts an upper perspective view of a controller housing conical light guide portion.
Figure 29:
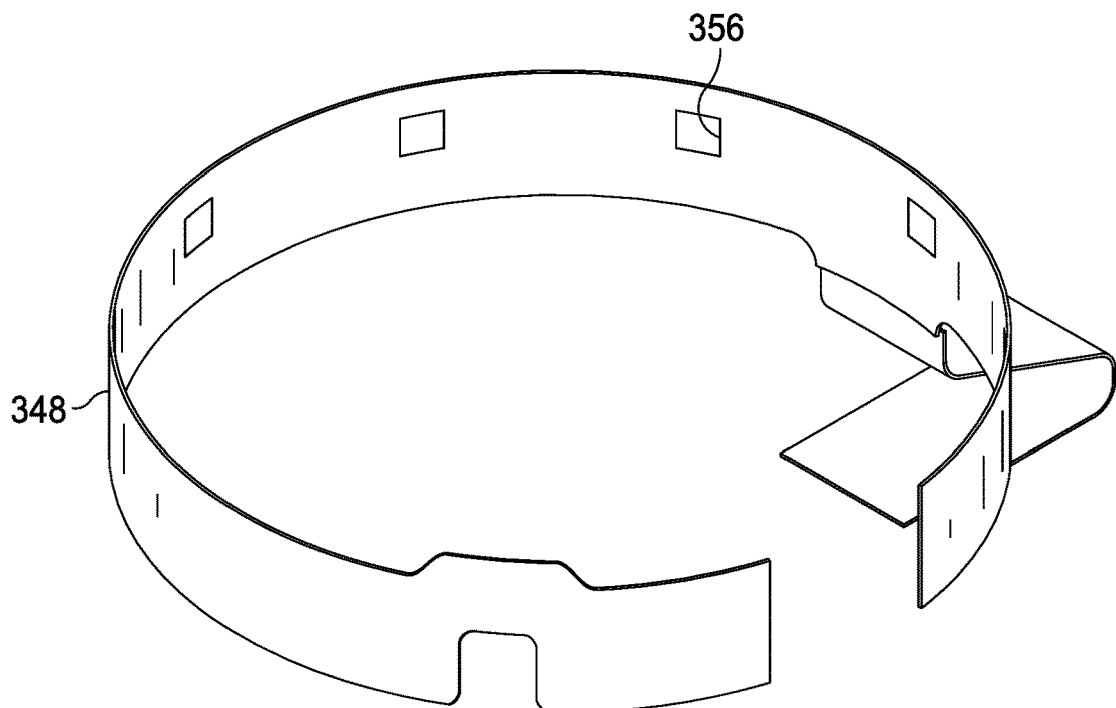
FIG. 29 depicts a side perspective view of a flexible printed circuit having LEDs to illuminate a joystick.

Referring now to FIG. 28, an upper perspective view depicts a controller housing conical light guide portion. The light guide 360 accepts illumination from a side surface about its circumference to allow space for a generous array of LEDs for good variations in LED color and intensity. Inner portions of light guide 360 may be treated to direct light towards the circular opening through which the joystick fits and to prevent illumination leakage where such leakage could distract an end user. A mount clearance area 358 fits over portions of the joystick and aids in alignment at assembly. FIG. 29 depicts a side perspective view of flexible printed circuit 348 having LEDs 356 to illuminate a joystick. A mount clearance 358 aligns with that of light guide 360 to aid in assembly and coupling of the flexible printed circuit board to the main game controller printed circuit board.

Referring now to FIG. 30, a side cutaway view depicts a joystick 14 illuminated by five LEDs 356 mounted at a bottom location. LEDs 356 tend to have difficulty directing illumination from the bottom location towards joystick 14 due to the interference area of the encasement around joystick 14 and the optical lens provided to a light guide that directs the illumination toward the game controller upper surface. FIG. 30B illustrates non-uniformity that is provided by the bottom illumination at a translucent region 352. FIG. 30C illustrates reduced illumination levels achieved at the joystick 14 circumference translucent region 352.

Referring now to FIG. 31, a side cutaway view depicts a joystick 14 illuminated by ten LEDs 356 mounted at a side location. The greater surface area of light guide 360 around its circumference provides space to arrange LEDs 356 to direct illumination in an efficient and effective manner towards translucent region 352. As a result, illumination uniformity depicted by FIG. 31B is improved relative to bottom illumination and a greater illumination intensity is available as depicted by FIG. 31C.

Although the present invention has been described in detail, it should be understood that various changes, substitutions and alterations can be made hereto without departing from the spirit and scope of the invention as defined by the appended claims.

What is claimed is:

1. A game controller comprising:
   a bridge housing having first and second controller attachment structures disposed on opposing side surfaces;
   a bridge processor disposed in the bridge housing and operable to execute instructions that process information;
   bridge non-transitory memory interfaced with the bridge processor and operable to store bridge instructions that execute on the bridge processor;
   first and second bridge wired links interfaced with the bridge processor and exposed at the bridge housing opposing side surfaces;
   first and second controller housings, each controller housing having an attachment structure disposed on a side surface and configured to detachably couple to one of the bridge housing attachment structures;
   first and second controller processors disposed in the first and second controller housings and operable to execute instructions that process information;
   first and second controller non-transitory memories interfaced with the first and second controller processors and operable to store controller instructions that execute on the first and second controller processors; and
   first and second controller wired links interfaced with the first and second controller processors and exposed at the first and second controller housing side surfaces and aligned to interface with the first and second bridge wired links;
   wherein:
   the bridge instructions when executed on the bridge processor having a state machine that accepts inputs through the bridge wired links from the controller processors and communicates the inputs to an information handling system; and
   the controller instructions when executed on the controller processor having a state machine that accepts inputs from input devices interfaced with the controller processor and forwards the inputs to the bridge processor;
   wherein:
   the bridge instructions receive a controller instruction update and store the controller instruction update in the bridge non-transitory memory to apply the controller instruction update when a controller interfaces with a bridge and lacks the update; and the controller instructions receive a bridge update and store the bridge update in the controller non-transitory memory to apply the bridge update when a bridge interfaces with the controller and lacks the bridge update.

2. The information handling system of claim 1 wherein:
the bridge instructions when executed on the bridge processor further accept inputs from the information handling system to command a haptic response and communicates the inputs to the controller through the bridge wired link; and the controller instructions when executed on the controller processor applying power to a haptic device to generate the haptic response in response to the command received from the bridge wired link at the controller wired link.

3. The information handling system of claim 2 wherein the bridge wired link and the controller wired link comprise an I2C link.

4. The information handling system of claim 1 wherein:
the bridge instructions when executed on the bridge processor receive a controller instruction update from the information handling system and in response communicate the controller instruction update through the bridge wired link to the controller non-transitory memory and command a bootloader at the controller processor; and the controller instructions when executed on the controller processor receive the controller instructions update through the controller wired link and perform the bootloader in response to the command to install the controller instruction update.

5. The information handling system of claim 4 wherein the bridge instructions and controller instructions exchange compatibility information at initialization, the bridge instructions performing the controller instruction update.

6. The information handling system of claim 5 wherein the bridge housing further comprise a wireless interface to communicate with the information handling system and the controller housing communicates only through the controller wired link.

7. The information handling system of claim 1 wherein:
the first and second controller housing attachment structures detachably couple to first and second opposing sides of an information handling system housing to interface the first and second controller wired links to first and second information handling system wired links; and the controller instructions forward the inputs directly to the information handling system from the first and second wired links to the first and second information handling system wired links.

8. The information handling system of claim 1 wherein:
the information handling system communicates a controller instruction update through the information handling system and controller wired links to the controller non-transitory memory and commands a bootloader at the controller processor; and the controller instructions receive the controller instructions update through the controller wired link and perform the bootloader in response to the command to install the controller instruction update.

9. The information handling system of claim 8 wherein:
the information handling system communicates a bridge update through the information handling system and controller wired links to the controller non-transitory memory; and the controller instructions at a next interface with the bridge wired link communicates the bridge update through the controller and bridge wired links to the bridge non-transitory memory.

10. A method for interfacing a peripheral device with an information handling system, the method comprising:
executing a controller state machine on a controller processor disposed in each of first and second controller housings;

executing a bridge state machine on a bridge processor disposed in a bridge housing;

detachably coupling the first and second controller housings to opposing sides of the bridge housing;

detecting inputs at the first and second controller housings with the controller state machines;

communicating the inputs from the controller state machines to the bridge state machine through first and second wired links;

communicating the inputs from the bridge state machine to an information handling system;

detaching the first and second controller housings from the bridge housing;

attaching the first and second controller housing to a side surface of the information handling system;

communicating directly between the first and second controller housings and the information handling system through the first and second wired links;

communicating a bridge state machine update from the information handling system to at least one of the controller housings through at least one of the first and second wired links;

storing the bridge state machine update in non-transitory memory of the at least one of the controller housings;

detecting attachment of the at least one of the controller housings to the bridge housing; and in response to detecting attachment, initiating installation of the bridge state machine update from the at least one of the controller housings.

11. The method of claim 10 further comprising:
communicating haptic feedback from the information handling system to the bridge state machine;

communicating the haptic feedback from the bridge state machine to the controller state machines; and activating a haptic device with each controller state machine.

12. The method of claim 10 further comprising:
communicating a controller state machine update from the information handling system to the bridge;

communicating the controller state machine update to the first and second controller housings through the first and second wired links; and initiating a bootloader at the first and second controller housings to install the controller state machine update.

13. The method of claim 12 wherein the controller state machine update is communicated to the bridge housing with a wireless interface and to the controller housing through an I2C wired interface.

14. The method of claim 12 further comprising:
detecting at the bridge housing that one or more of the first and second controller housings is detached from the bridge housing;

in response to the detecting detachment, storing the controller state machine update in non-transitory memory of the bridge housing;

detecting at the bridge housing attachment of the one or more of the first and second controller housings; and in response to the detecting attachment, initiating from the bridge housing communication of the controller state machine update.

15. A system for maintaining game controller embedded code, game controller having a game controller housing separate from an information handling system having a separate information handling system housing and a bridge having a separate bridge housing, the system comprising:

a game controller processor integrated in the game controller housing;

non-transitory memory integrated in the game controller housing and interfaced with the game controller processor;

instructions stored in the non-transitory memory that when executed on the game controller processor:

receive a controller embedded code update through a wired link from the information handling system communicated directly from the information handling system to the wired link and communicated indirectly from the information handling system through the bridge, the bridge directly communicating through the wired link; and install the controller embedded code update to execute a state machine on the game controller processor;

wherein the instructions further receives a bridge embedded code update for a bridge processor directly from the information handling system through the wired link, stores the bridge embedded code update in the non-transient memory, and communicates the bridge embedded code update to the bridge through the wired link at a subsequent direct interface between the game controller housing and the bridge housing.

16. The game controller of claim 15 wherein the instructions further communicate the controller update through the wired interface to the bridge, the bridge operable to apply the controller update at a different controller interfaced with the bridge.

17. The game controller of claim 15 wherein the instructions further receive both the controller embedded code update and the bridge embedded code update from the bridge through the wired link and communicate the controller embedded code update and the bridge embedded code update to the information handling system through the wired link at a subsequent direct interface between the game controller and the information handling system.

* * * * *